United States Patent
Satoh et al.

(10) Patent No.: US 10,244,147 B2
(45) Date of Patent: Mar. 26, 2019

(54) IMAGE CAPTURING DEVICE AND COLOR MEASUREMENT METHOD FOR CAPTURING A REFERENCE CHART AND A SUBJECT

(71) Applicants: Nobuyuki Satoh, Kanagawa (JP);
Yasuyuki Suzuki, Kanagawa (JP);
Masato Kobayashi, Kanagawa (JP);
Suguru Yokozawa, Kanagawa (JP);
Tatsuhiko Okada, Saitama (JP);
Mamoru Yorimoto, Kanagawa (JP);
Daisaku Horikawa, Saitama (JP);
Yuichi Sakurada, Tokyo (JP)

(72) Inventors: Nobuyuki Satoh, Kanagawa (JP);
Yasuyuki Suzuki, Kanagawa (JP);
Masato Kobayashi, Kanagawa (JP);
Suguru Yokozawa, Kanagawa (JP);
Tatsuhiko Okada, Saitama (JP);
Mamoru Yorimoto, Kanagawa (JP);
Daisaku Horikawa, Saitama (JP);
Yuichi Sakurada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/891,832

(22) Filed: Feb. 8, 2018

(65) Prior Publication Data
US 2018/0167534 A1    Jun. 14, 2018

Related U.S. Application Data

(63) Continuation of application No. 15/292,885, filed on Oct. 13, 2016, now Pat. No. 9,906,688, which is a
(Continued)

(30) Foreign Application Priority Data

Nov. 30, 2011    (JP) .................................. 2011-262646
Feb. 14, 2012    (JP) .................................. 2012-029920
Oct. 30, 2012    (JP) .................................. 2012-239455

(51) Int. Cl.
*G01J 3/02* (2006.01)
*G01J 3/06* (2006.01)
(Continued)

(52) U.S. Cl.
CPC .......... *H04N 1/6033* (2013.01); *G01J 3/0208* (2013.01); *G01J 3/06* (2013.01);
(Continued)

(58) Field of Classification Search
None
See application file for complete search history.

(56) References Cited

U.S. PATENT DOCUMENTS 4,980,759 A * 12/1990 Smyth ................ H04N 1/40056
348/251
6,288,733 B1    9/2001 Nakazawa et al.
(Continued)

FOREIGN PATENT DOCUMENTS

JP    08-029259    2/1996
JP    11-14458     1/1999
(Continued)

OTHER PUBLICATIONS

Office Action dated Jun. 17, 2014 in Japanese Patent Application No. 2010-208370.
(Continued)

*Primary Examiner* — Scott A Rogers
(74) *Attorney, Agent, or Firm* — Oblon, McClelland, Maier & Neustadt, L.L.P.

(57)    ABSTRACT

An image capturing unit includes a sensor unit that image-captures a predetermined area including a subject; and a reference chart unit that is arranged in the predetermined area and captured with the subject by the sensor unit.

9 Claims, 34 Drawing Sheets

Related U.S. Application Data continuation of application No. 13/687,520, filed on Nov. 28, 2012, now Pat. No. 9,516,179.

(51) Int. Cl.

| | | |
|---|---|---|
| *G01J 3/46* | (2006.01) | |
| *G01J 3/52* | (2006.01) | |
| *H04N 1/00* | (2006.01) | |
| *H04N 1/41* | (2006.01) | |
| *H04N 1/50* | (2006.01) | |
| *H04N 1/60* | (2006.01) | |
| *G06K 15/02* | (2006.01) | |
| *G06K 15/10* | (2006.01) | |
| *H04N 1/028* | (2006.01) | |
| *H04N 1/034* | (2006.01) | |
| *H04N 5/225* | (2006.01) | |

(52) U.S. Cl.
CPC . *G01J 3/46* (2013.01); *G01J 3/52* (2013.01); *G01J 3/524* (2013.01); *G06K 15/027* (2013.01); *H04N 1/00005* (2013.01); *H04N 1/00015* (2013.01); *H04N 1/00023* (2013.01); *H04N 1/00034* (2013.01); *H04N 1/00045* (2013.01); *H04N 1/00047* (2013.01); *H04N 1/00068* (2013.01); *H04N 1/00087* (2013.01); *H04N 1/00278* (2013.01); *H04N 1/00323* (2013.01); *H04N 1/0282* (2013.01); *H04N 1/41* (2013.01); *H04N 1/6008* (2013.01); *H04N 1/6044* (2013.01); *H04N 5/2253* (2013.01); *H04N 5/2254* (2013.01); *G01J 3/0237* (2013.01); *G06K 15/102* (2013.01); *G06K 2215/0094* (2013.01); *G06K 2215/101* (2013.01); *H04N 1/034* (2013.01); *H04N 1/50* (2013.01); *H04N 2201/0082* (2013.01)

(56) References Cited

U.S. PATENT DOCUMENTS

| | | | |
|---|---|---|---|
| 6,778,714 B1 | 8/2004 | Kipman et al. | |
| 8,064,108 B2 | 11/2011 | Chang et al. | |
| 8,320,023 B2 | 11/2012 | Takahashi et al. | |
| 8,358,452 B2 | 1/2013 | Haas et al. | |
| 8,446,651 B2 | 5/2013 | Murosaki | |
| 8,532,371 B2 | 9/2013 | Agarwal et al. | |
| 8,678,540 B2 | 3/2014 | Satoh et al. | |
| 8,693,060 B2 | 4/2014 | Ito | |
| 8,947,731 B2 | 2/2015 | Suzuki et al. | |
| 9,077,835 B2 | 7/2015 | Ozawa et al. | |
| 9,280,734 B2* | 3/2016 | Kishi | G06K 15/027 |
| 9,286,551 B2 | 3/2016 | Yokozawa et al. | |
| 9,531,918 B2* | 12/2016 | Mitsubori | H04N 1/6033 |
| 9,749,502 B2* | 8/2017 | Kishi | H04N 1/6033 |
| 2007/0229870 A1 | 10/2007 | Doi et al. | |
| 2011/0176155 A1* | 7/2011 | Toriyabe | H04N 1/00002 |
| | | | 358/1.9 |
| 2012/0069411 A1 | 3/2012 | Satoh et al. | |
| 2012/0133995 A1 | 5/2012 | Chun et al. | |
| 2013/0027720 A1 | 1/2013 | Satoh | |
| 2013/0027721 A1 | 1/2013 | Kobayashi et al. | |
| 2013/0229671 A1 | 9/2013 | Yokozawa et al. | |
| 2013/0242319 A1 | 9/2013 | Suzuki et al. | |
| 2013/0242320 A1 | 9/2013 | Suzuki et al. | |
| 2013/0242321 A1 | 9/2013 | Okada et al. | |
| 2013/0242361 A1 | 9/2013 | Matsumoto et al. | |
| 2017/0094128 A1* | 3/2017 | Kishi | H04N 1/6041 |

FOREIGN PATENT DOCUMENTS

| | | |
|---|---|---|
| JP | 3129502 | 11/2000 |
| JP | 2002-290757 | 10/2002 |
| JP | 2003-24283 | 1/2003 |
| JP | 2004-109098 | 4/2004 |
| JP | 2005-341175 | 12/2005 |
| JP | 2007-163314 | 6/2007 |
| JP | 2007-258962 A | 10/2007 |
| JP | 2007-266841 | 10/2007 |
| JP | 2008-256515 | 10/2008 |
| JP | 2008-283375 | 11/2008 |
| JP | 2008-292495 | 12/2008 |
| JP | 2009-239419 | 10/2009 |
| JP | 2010-83007 | 4/2010 |

OTHER PUBLICATIONS

Office Action dated Jul. 12, 2016 in Japanese Application No. 2012-239455.

* cited by examiner

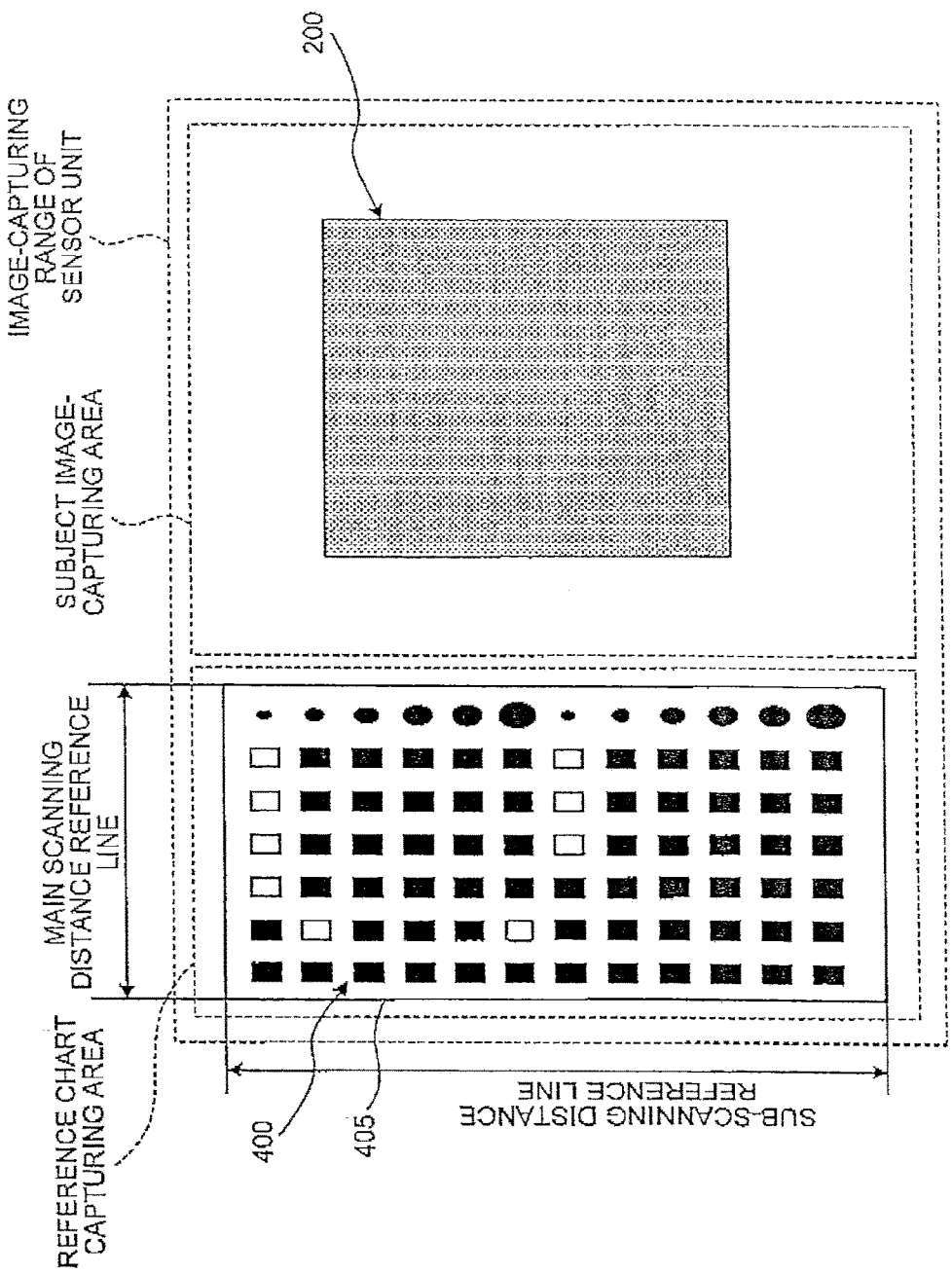

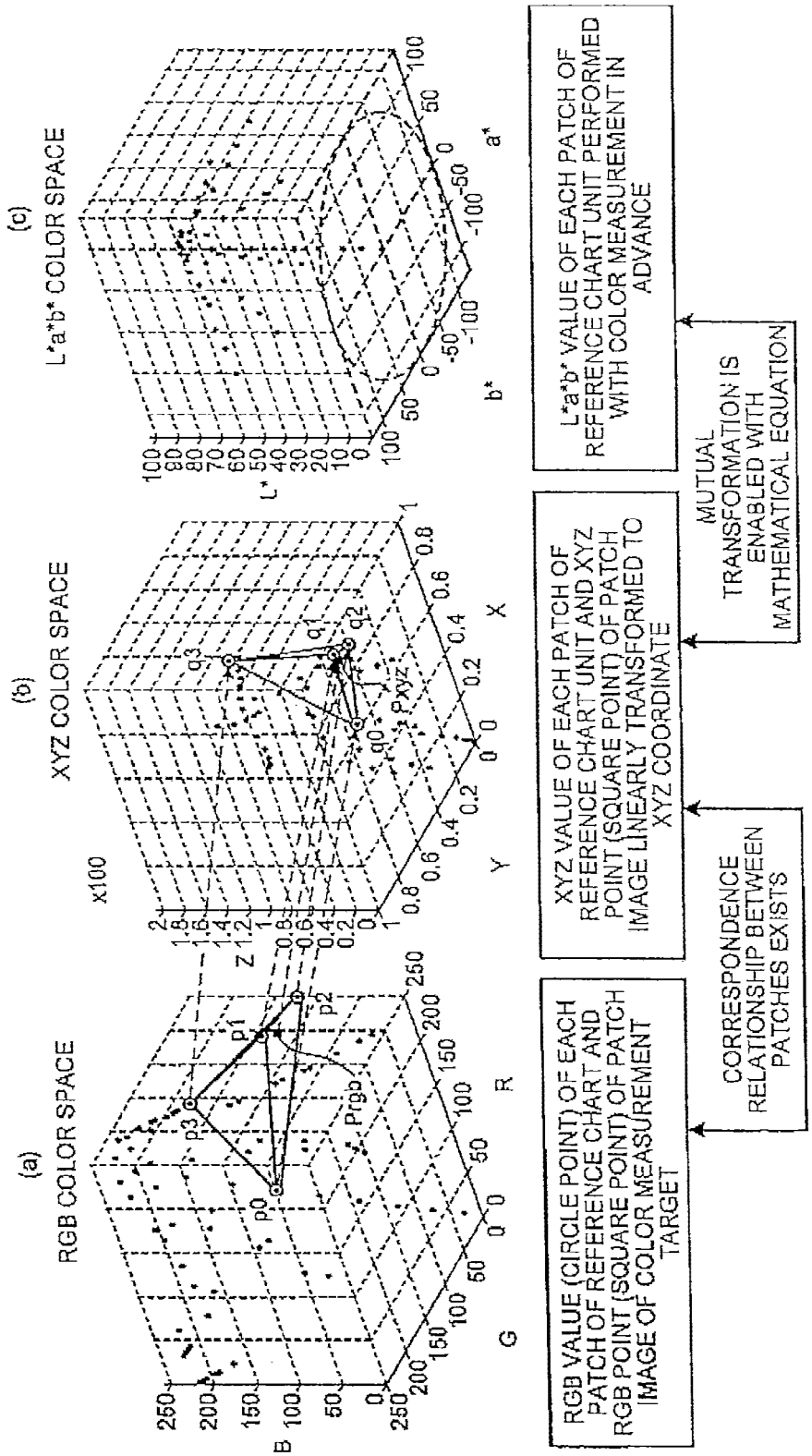

FIG.10A

XYZ $\Rightarrow$ Lab $$f_x = \begin{cases} \sqrt[3]{x_r} & x_r > 0.008856 \\ (903.3 \times x_r + 16)/116 & x_r \leq 0.008856 \end{cases}$$

$$f_y = \begin{cases} \sqrt[3]{y_r} & y_r > 0.008856 \\ (903.3 \times y_r + 16)/116 & y_r \leq 0.008856 \end{cases}$$

$$f_z = \begin{cases} \sqrt[3]{z_r} & z_r > 0.008856 \\ (903.3 \times z_r + 16)/116 & z_r \leq 0.008856 \end{cases}$$

$x_r = X/X_r$
$y_r = Y/Y_r$
$z_r = Z/Z_r$
$L = 116 \times f_y - 16$
$a = 500 \times (f_x - f_y)$
$b = 200 \times (f_y - f_z)$

FIG.10B

Lab $\Rightarrow$ XYZ $$x_r = \begin{cases} f_x^3 & f_x^3 > 0.008856 \\ (116 \times f_x - 16)/903.3 & f_x^3 \leq 0.008856 \end{cases}$$

$$y_r = \begin{cases} ((L+16)/116)^3 & L > 903.3 \times 0.008856 \\ L/903.3 & L \leq 903.3 \times 0.008856 \end{cases}$$

$$z_r = \begin{cases} f_z^3 & f_z^3 > 0.008856 \\ (116 \times f_z - 16)/903.3 & f_z^3 \leq 0.008856 \end{cases}$$

$f_x = \dfrac{a}{500} + f_y$ $$f_y = \begin{cases} (L+16)/116 & y_r > 0.008856 \\ (903.3 \times y_y + 16)/116 & y_r \leq 0.008856 \end{cases}$$

$f_z = f_y - \dfrac{b}{200}$ $X = x_r \times X_r$
$Y = y_r \times Y_r$
$Z = z_r \times Z_r$

FIG.15

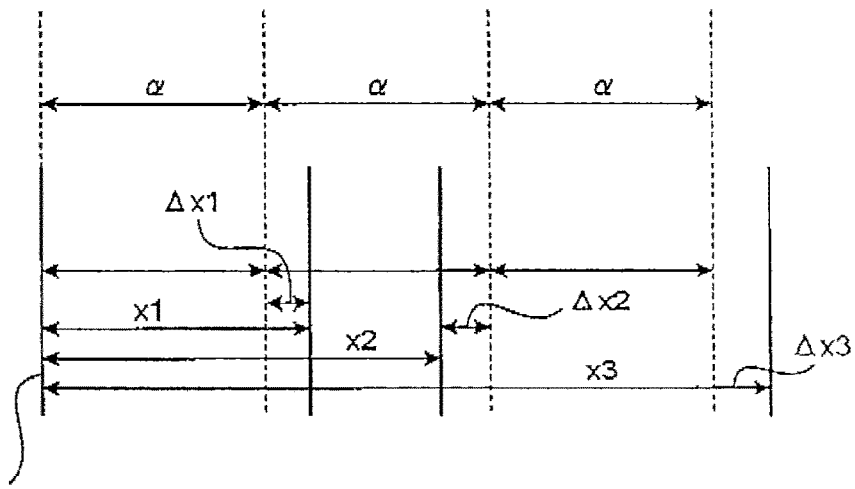

REFERENCE LINE FOR MEASURING POSITIONAL
DEVIATION IN MAIN SCANNING DIRECTION

FIG.16

FIRST BLACK VERTICAL LINE
FORMED ON LEFTMOST SIDE IN
PATTERN FOR MEASURING
POSITIONAL DEVIATION IN MAIN
SCANNING DIRECTION OF PRINT
HEAD LOCATED DOWNSTREAM

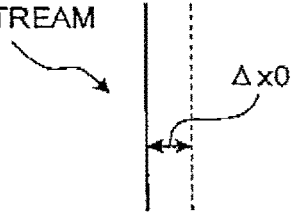

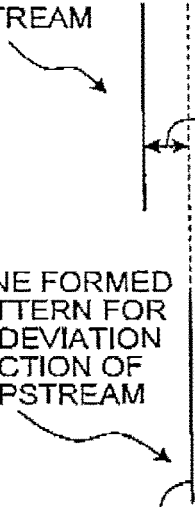

FIRST BLACK VERTICAL LINE FORMED
ON LEFTMOST SIDE IN PATTERN FOR
MEASURING POSITIONAL DEVIATION
IN MAIN SCANNING DIRECTION OF
PRINT HEAD LOCATED UPSTREAM

REFERENCE LINE FOR
MEASURING POSITIONAL
DEVIATION IN MAIN SCANNING
DIRECTION

| PATCH NUMBER | INITIAL REFERENCE RGB VALUE (RdGdBd) | | | Ld | ad | bd | Xd | Yd | Zd |
|---|---|---|---|---|---|---|---|---|---|
| | Rd | Gd | Bd | | | | | | |
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

Tb1

IMAGE CAPTURING DEVICE AND COLOR MEASUREMENT METHOD FOR CAPTURING A REFERENCE CHART AND A SUBJECT

CROSS-REFERENCE TO RELATED APPLICATIONS

The present application is a continuation of U.S. application Ser. No. 15/292,885, filed Oct. 13, 2016, which is a is a continuation of U.S. application Ser. No. 13/687,520, filed Nov. 28, 2012, which claims priority to and incorporates by reference the entire contents of Japanese Patent Application No. 2011-262646 filed in Japan on Nov. 30, 2011, Japanese Patent Application No. 2012-029920 filed in Japan on Feb. 14, 2012, and Japanese Patent Application No. 2012-239455 filed in Japan on Oct. 30, 2012.

BACKGROUND OF THE INVENTION

1. Field of the Invention

The present invention relates to an image capturing unit, a color measuring device, an image forming apparatus, a color measuring system, and a color measurement method.

2. Description of the Related Art

In an image forming apparatus such as a printer, processing called "color management" is performed to suppress the variability of outputs due to device-specific characteristics and enhance the reproducibility of the outputs with respect to inputs. The color management is performed in the following steps, for example. First, an image of a reference color chart (or patch) is actually output by an image forming apparatus (in the following, a patch output by an image forming apparatus as an image is referred to as "patch image"), and a color measuring device performs color measurement on this patch image. A color conversion parameter is generated based on a difference between a color measurement value of the color-measured patch image and a color specification value in a standard color space of the corresponding reference color, and this color conversion parameter is set in the image forming apparatus. After that, when outputting an image corresponding to input image data, the image forming apparatus performs color conversion on the input image data based on the set color conversion parameter and outputs an image based on the image data after the color conversion. By this means, the image forming apparatus can perform image output of high reproducibility in which the variability of outputs due to device-specific characteristics is suppressed.

In the above color management, as a measuring device to measure a patch image, a spectrum measurer is widely used. The spectrum measurer can acquire the spectral reflectivity for each wavelength and therefore perform color measurement with high accuracy. However, the spectrum measurer is an expensive device and therefore it is demanded that color measurement with high accuracy can be performed using a cheaper device.

Examples of a method of realizing color measurement at a low cost include that a color measurement target is imaged as a subject by an imaging apparatus having an image sensor and the RGB values of the subject acquired by capturing an image are converted into color specification values in the standard color space. For example, Japanese Patent No. 3129502 discloses a technique of: providing a reference color chart as a comparison target of a subject in a position near the subject of a color measurement target; imaging the subject and the reference color chart by a color video camera at the same time; correcting RGB data of the subject using the RGB data of the reference color chart acquired by capturing an image; and converting the RGB data of the subject into color specification values in the standard color space.

However, in the technique disclosed in Japanese Patent No. 3129502, it is difficult to hold positional relations among a subject, a reference color chart and a color video camera; image-capturing conditions vary every time when an image is captured; and therefore there is a problem that stable imaging may not be performed.

Therefore, there is a need for an image capturing unit, color measuring device, image forming apparatus, color measuring system, and color measurement method capable of performing stable imaging.

SUMMARY OF THE INVENTION

According to an embodiment, there is provided an image capturing unit that includes a sensor unit that image-captures a predetermined area including a subject; and a reference chart unit that is arranged in the predetermined area and captured with the subject by the sensor unit.

According to another embodiment, there is provided a color measuring system that includes an image capturing unit that captures a subject of color measurement target, and a calculating unit configured to calculate a color measurement value of the subject. The image capturing unit includes a sensor unit that image-captures a predetermined area including the subject; and a reference chart unit that is arranged in the predetermined area and captured with the subject in the sensor unit. The calculating unit calculates a color measurement value of the subject based on an image of the subject and the reference chart unit captured by the sensor unit of the image capturing unit.

According to still another embodiment, there is provided a color measurement method executed in a color measuring device including a sensor unit, and a reference chart unit and a calculating unit. The method includes capturing a subject of a color measurement target and the reference chart unit by the sensor unit; and calculating a color measurement value of the subject by the calculating unit based on an image of the subject and the reference chart unit captured by the sensor unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating an example of image data acquired by capturing a patch image of a color measurement target and a reference chart unit in a sensor unit at the same time;

FIG. 9 is a view explaining a specific example of a color measurement method of a patch image;

FIGS. 10A and 10B are views illustrating a conversion equation to perform conversion between an L*a*b* value and an XYZ value;

FIG. 15 is a view illustrating a method of measuring main-scanning positional deviation in an image;

FIG. 16 is a view illustrating a method of measuring main-scanning positional deviation in an image;

DETAILED DESCRIPTION OF THE PREFERRED EMBODIMENTS

In the following, the preferred embodiments of an image capturing unit, color measuring device, image forming apparatus, color measuring system, and color measurement method according to the present invention will be described with reference to the accompanied drawings. Here, although the embodiments described below exemplify an ink-jet printer as an example of an image forming apparatus applied with the present invention, the present invention is widely applicable to various types of image forming apparatuses that output an image to a recording medium.

Mechanical Configuration of Image Forming Apparatus

Figure 1:
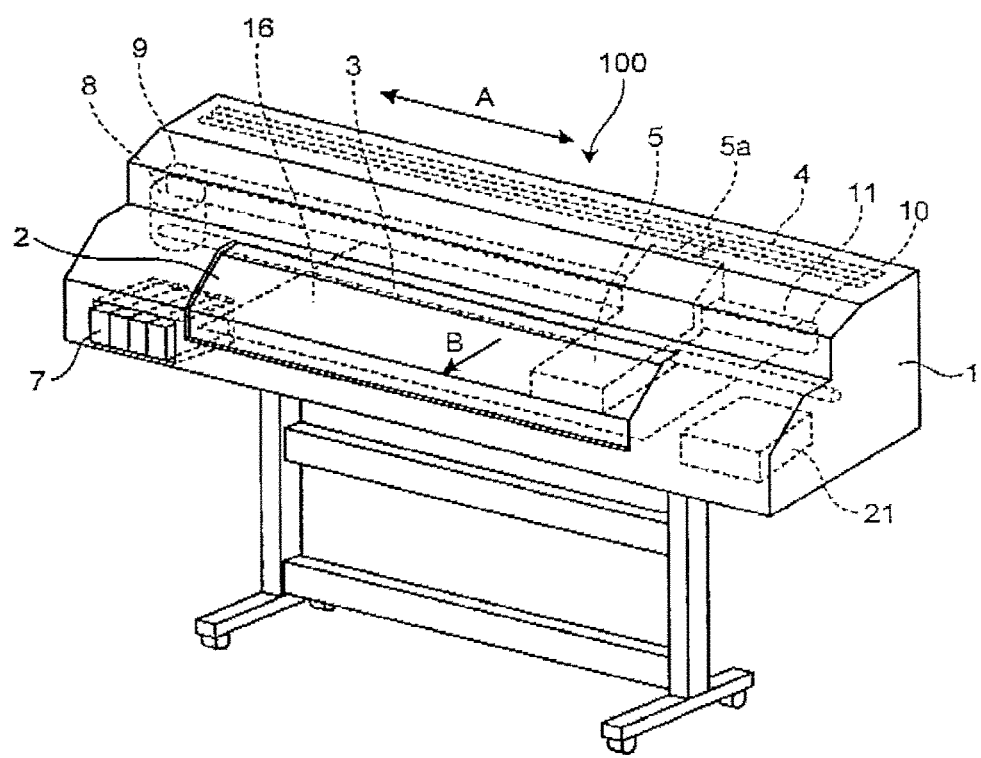
FIG. 1 is a perspective view illustrating the inside of an image forming apparatus in a see-through manner.

First, a mechanical configuration of an image forming apparatus 100 according to the present embodiment will be described with reference to FIG. 1 to FIG. 3. FIG. 1 is a perspective view illustrating the inside of the image forming apparatus 100 according to the present embodiment in a see-through manner, FIG. 2 is a top view of the mechanical configuration of the inside of the image forming apparatus 100 according to the present embodiment, and FIG. 3 is a view for explaining an exemplary arrangement of a print head 6 mounted on a carriage 5.

As illustrated in FIG. 1, the image forming apparatus 100 according to the present embodiment includes the carriage 5 that reciprocates in a main-scanning direction (direction of arrow A in FIG. 1) thus forming an image on a recording medium 16 conveyed intermittently in a sub-scanning direction (direction of arrow B in FIG. 1). The carriage 5 is supported by a main guide rod 3 extending along the main-scanning direction. The carriage 5 is provided with a connection piece 5a. The connection piece 5a engages with a sub guide member 4 arranged in parallel with the main guide rod 3, and stabilizes the position of the carriage 5.

Figure 2:
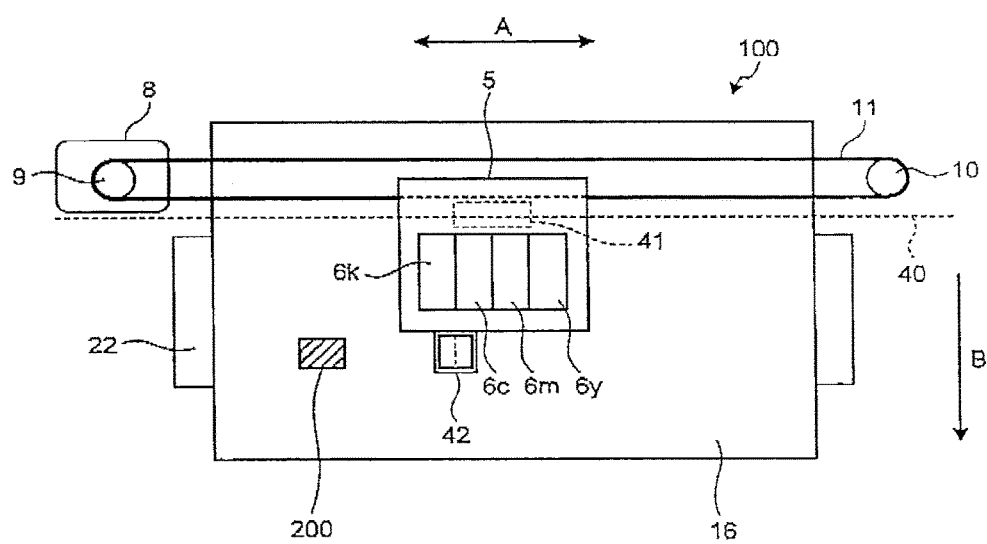
FIG. 2 is a top view of a mechanical configuration of the inside of the image forming apparatus.
Figure 3:
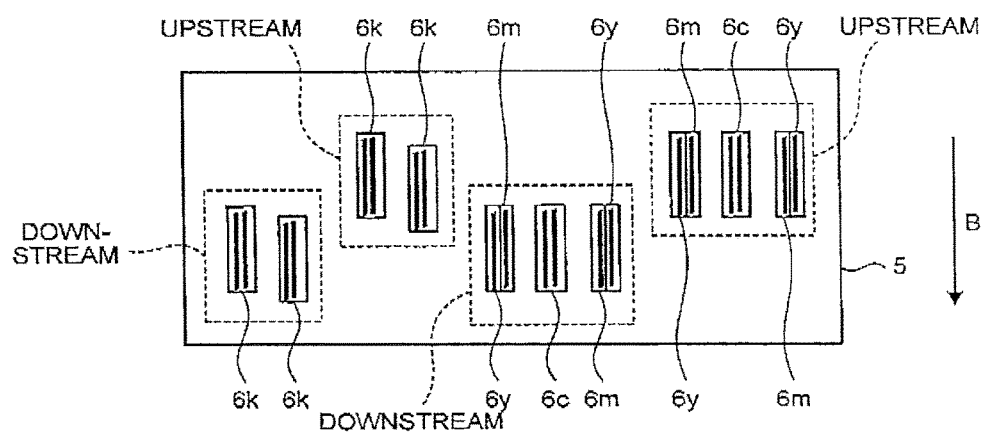
FIG. 3 is a view for explaining an exemplary arrangement of a print head mounted on a carriage.

As illustrated in FIG. 2, the carriage 5 includes a print head 6y that ejects yellow (Y) ink, a print head 6m that ejects magenta (M) ink, a print head 6c that ejects cyan (C) ink, and a plurality of multiple print heads 6k that eject black (Bk) ink (hereinafter, if the print heads 6y, 6m, 6c, and 6k are called collectively, the print heads are referred to as a print head 6). The print head 6 is mounted on the carriage 5 with an ejection surface (nozzle surface) facing downward (toward the recording medium 16).

A cartridge 7 is an ink supplier for supplying ink to the print head 6. The cartridge 7 is not mounted on the carriage 5, but is arranged at a predetermined position in the image forming apparatus 100. The cartridge 7 and the print head 6 are connected by a pipe, which is not illustrated, and the cartridge 7 supplies ink to the print head 6 through the pipe.

The carriage 5 is connected to a timing belt 11 stretched across a driving pulley 9 and a driven pulley 10. The driving pulley 9 rotates by drive of a main-scanning motor 8. The driven pulley 10 has a mechanism for adjusting the distance between the driving pulley 9 and the driven pulley 10, and has a function to apply predetermined tension to the timing belt 11. The drive of the main-scanning motor 8 moves the timing belt 11, thereby causing the carriage 5 to reciprocate in the main-scanning direction. As illustrated in FIG. 2, for example, the movement of the carriage 5 in the main-scanning direction is controlled based on an encoder value, which is obtained by an encoder sensor 41 provided to the carriage 5 detecting a mark of an encoder sheet 40.

The image forming apparatus 100 according to the present embodiment includes a maintenance mechanism 21 for maintaining reliability of the print head 6. The maintenance mechanism 21 performs cleaning and capping for the ejection surface of the print head 6, ejection of unnecessary ink from the print head 6, and other operations.

As illustrated in FIG. 2, a platen 22 is arranged at a position facing the ejection surface of the print head 6. The platen 22 supports the recording medium 16 when the print head 6 ejects ink on the recording medium 16. The image forming apparatus 100 according to the present embodiment is a wide apparatus in which the carriage 5 moves for a long distance in the main-scanning direction. Therefore, the platen 22 is formed of a plurality of plate members joined in the main-scanning direction (direction of movement of the carriage 5). The recording medium 16 is nipped by carriage rollers driven by a sub-scanning motor, which is not illustrated, and is conveyed intermittently in the sub-scanning direction on the platen 22.

The print head 6 includes a plurality of nozzle arrays. The print head 6 ejects ink from the nozzle arrays on the recording medium 16 conveyed on the platen 22, thereby forming an image on the recording medium 16. In the present embodiment, to ensure a large width of an image that can be formed on the recording medium 16 in one scanning of the carriage 5, the print heads 6 located upstream and the print heads 6 located downstream are mounted on the carriage 5, as illustrated in FIG. 3. Furthermore, the print heads 6k that eject black ink are mounted on the carriage 5 twice as many as the print heads 6y, 6m, and 6c that eject color ink. Furthermore, the print heads 6y and 6m are arranged side by side in a manner separated from each other. This configuration is employed for keeping order of colors superimposed during the reciprocation of the carriage 5 so as not to change the order of colors between the forward movement and the backward movement. The arrangement of the print head 6 illustrated in FIG. 3 is just an example, and the arrangement of the print head 6 is not limited thereto.

The components described above constituting the image forming apparatus 100 according to the present embodiment are arranged inside of an exterior body 1. The exterior body 1 is provided with a cover member 2 in an openable and closable manner. When maintenance of the image forming apparatus 100 is being done, or when a jam occurs, the cover member 2 is opened, making it possible to perform operations on the components arranged inside of the exterior body 1.

The image forming apparatus 100 according to the present embodiment conveys the recording medium 16 intermittently in the sub-scanning direction, and also causes the carriage 5 to move in the main-scanning direction while the conveyance of the recording medium 16 in the sub-scanning direction is stopped, and at the same time, ejects ink on the recording medium 16 placed on the platen 22 from the nozzle arrays of the print head 6 mounted on the carriage 5, thereby forming an image on the recording medium 16.

In particular, to perform calibration for adjusting output characteristics of the image forming apparatus 100, the image forming apparatus 100 ejects ink on the recording medium 16 placed on the platen 22 from the nozzle arrays of the print head 6 mounted on the carriage 5 to form a patch image 200 to be a target for color measurement on the recording medium 16. The patch image 200 is an image obtained by the image forming apparatus 100 outputting a patch in a reference color, and reflects the output characteristics of the image forming apparatus 100. Therefore, by generating a color conversion parameter based on difference between the color measurement value of the patch image 200 and the color specification value of the reference color corresponding thereto in the standard color space and by outputting an image based on image data on which color conversion is performed using the color conversion parameter; the image forming apparatus 100 can output an image with high reproducibility.

The image forming apparatus 100 according to the present embodiment has a color measuring device that performs color measurement on the patch image 200 output to the recording medium 16. The color measuring device includes an image capturing unit 42 that simultaneously images the patch image 200 and a reference chart unit 400 to be described later using, as a subject, the patch image 200 of a color measurement target formed on the recording medium 16 by the image forming apparatus 100. The color measuring device calculates a color measurement value of the patch image 200 based on image data of the patch image 200 and the reference chart unit 400 acquired by capturing the patch image 200 and the reference chart unit 400 by the image capturing unit 42. Here, this color measuring device has not only a function of calculating the color measurement value of the patch image 200 but also a function of calculating a positional deviation amount of an image output from the image forming apparatus 100 using the image data acquired by capturing an image in the image capturing unit 42, and a function of calculating a dot diameter in an image output from the image forming apparatus 100 using the image data acquired by capturing an image in the image capturing unit 42.

As illustrated in FIG. 2, the image capturing unit 42 is fixed to the carriage 5 and reciprocated together with the carriage 5 in the main-scanning direction. The image capturing unit 42 uses, as a subject, the image formed on the recording medium 16 (or the patch image 200 of the color measurement target at the time of performing color measurement on the patch image 200), and, when it moves to a position facing the subject, the image capturing unit 42 captures the subject and the reference chart unit 400 at the same time. Here, to capture them at the same time means to acquire image data of one frame including the subject and the reference chart unit 400. That is, even if there is a time difference in the data acquisition of each pixel, by acquiring image data including the subject and the reference chart unit 400 in one frame, it means that the subject and the reference chart unit 400 are imaged at the same time.

Specific Example of Image Capturing Unit

Figure 4A:
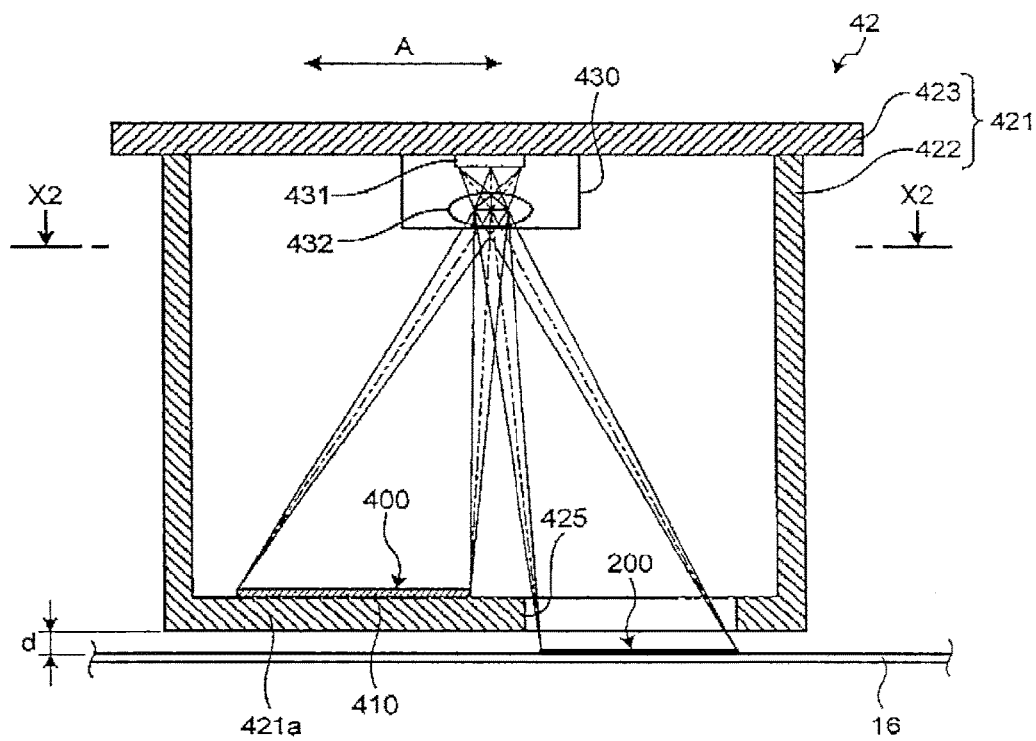
FIG. 4A is a vertical cross-sectional view of an image capturing unit (i.e. a cross-sectional view of the X1-X1 line in FIG. 4B)
Figure 4B:
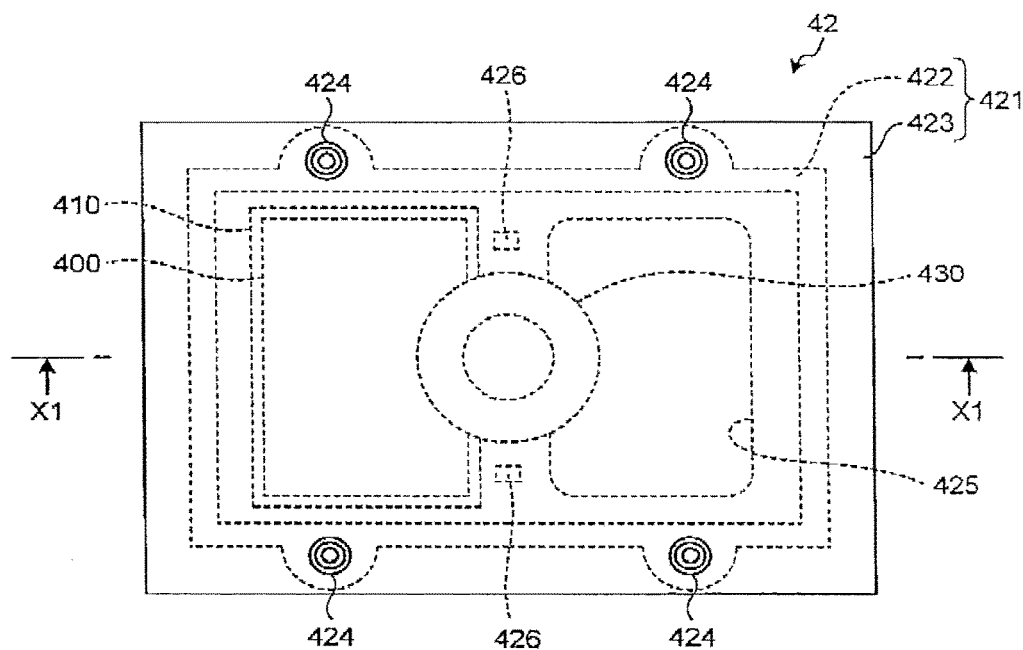
FIG. 4B is a top view seeing through and illustrating the inside of the image capturing unit.
Figure 4C:
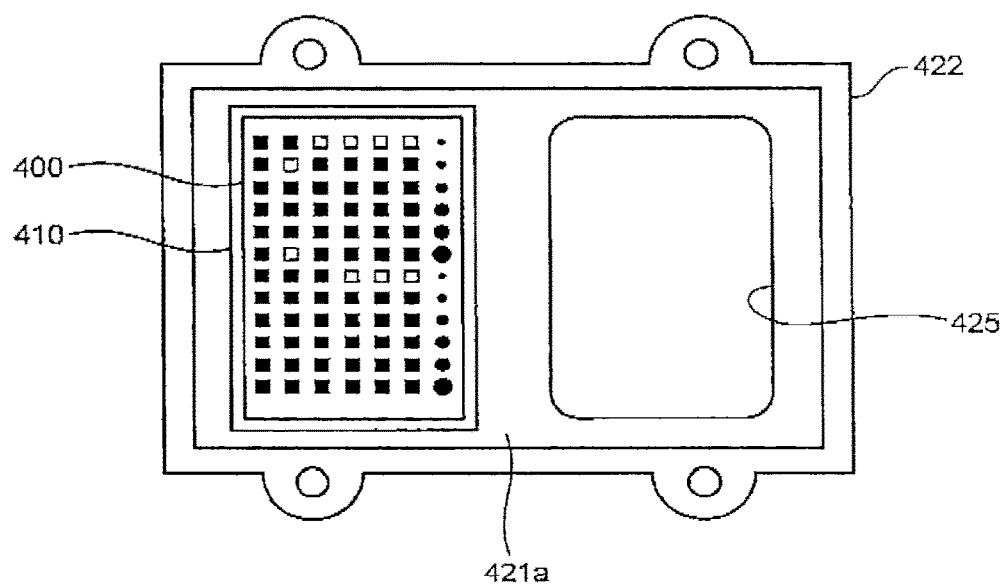
FIG. 4C is a plan view of a bottom surface of a housing seen in the X2 direction in FIG. 4A.

Next, with reference to FIGS. 4A to 4C, a specific example of the image capturing unit 42 will be described in detail. FIG. 4A is a vertical cross-sectional view of the image capturing unit 42 (i.e. a cross-sectional view of the X1-X1 line in FIG. 4B), FIG. 4B is a top view seeing through and illustrating the inside of the image capturing unit 42 and FIG. 4C is a plan view of a bottom surface of a housing seen from the X2 direction in FIG. 4A.

The image capturing unit 42 has a housing 421 configured by combining a frame body 422 and a board 423. The frame body 422 is formed to a bottomed tubular shape in which one end side corresponding to the upper surface of the housing 421 is opened. The board 423 is fastened to the frame body 422 by a fastener member 424 to be integrated with the frame body 422 so as to close the opening end of the frame body 422 and configure the upper surface of the housing 421.

The housing 421 is fixed to the carriage 5 with a bottom surface 421a facing the recording medium 16 on the platen 22 with a predetermined gap d interposed therebetween. The bottom surface (a first surface) 421a of the housing 421 facing the recording medium 16 has an opening 425 that allows the subject (patch image 200) formed on the recording medium 16 to be captured from the inside of the housing 421.

In the inside of the housing 421, a sensor unit 430 to capture an image is provided. The sensor unit 430 includes a two-dimensional image sensor 431 such as a CCD sensor and a CMOS sensor; and an imaging lens 432 that forms an optical image in an image-capturing range of the sensor unit 430, on a sensor surface of the two-dimensional image sensor 431. The two-dimensional image sensor 431 is mounted on, for example, the internal surface (i.e. component mounting surface) of the board 423 such that the sensor surface faces the side of the bottom surface 421a of the housing 421. The imaging lens 432 is fixed in a state where its position with respect to the two-dimensional image sensor 431 is determined so as to hold a positional relation determined based on the optical characteristics.

On the internal surface side of the bottom surface 421a of the housing 421 that faces the sensor unit 430, a chart plate 410, in which the reference chart unit 400 is formed, is arranged so as to be adjacent to the opening 425 provided on the bottom surface 421a. The chart plate 410 is bonded to the internal surface side of the bottom surface 421a of the housing 421 by an adhesion bond or the like, using, as an adhesive surface, an opposite surface to the surface on which the reference chart unit 400 is formed; and the chart plate 410 is held in a state where it is fixed to the housing 421. The reference chart unit 400 may be directly formed on the internal surface side of the bottom surface 421a of the housing 421 rather than on the chart plate 410. In this case, the chart plate 410 is not necessary. The reference chart unit 400 is imaged together with a subject (i.e. patch image 200) by the sensor unit 430, as a comparison target of the subject (i.e. patch image 200), for example. That is, the sensor unit 430 captures the subject (i.e. patch image 200) outside the housing 421 via the opening 425 provided on the bottom surface 421a of the housing 421 and captures the reference chart unit 400 on the chart plate 410 provided on the internal surface side of the bottom surface 421a of the housing 421 at the same time. Also, the reference chart unit 400 will be described later in detail.

The housing 421 also houses an illumination light source 426 that illuminates the subject (patch image 200) and the reference chart unit 400 when the sensor unit 430 captures the subject (patch image 200) and the reference chart unit 400 simultaneously. A light-emitting diode (LED) is used as the illumination light source 426, for example. In the present embodiment, two LEDs are used as the illumination light source 426. The two LEDs used as the illumination light source 426 are mounted on the inner surface of the board 423 together with the two-dimensional image sensor 431 of the sensor unit 430, for example. However, the illumination light source 426 only needs to be arranged at a position where the illumination light source 426 can illuminate the subject (patch image 200) and the reference chart unit 400, and does not necessarily need to be mounted on the board 423 directly. In the present embodiment, the LED is used as the illumination light source 426, but the type of light source is not limited to the LED. For instance, an organic EL, and the like may be used as the illumination light source 426. If the organic EL is used as the illumination light source 426, an illumination light close to a spectral distribution of a solar light is obtained, and thus the color measurement accuracy can be expected to be enhanced.

In the present embodiment, as illustrated in FIG. 4B, the two LEDs used as the illumination light source 426 are arranged such that the projected positions on the bottom surface 421a vertically viewed from the board 423 side to the bottom surface 421a side of the housing 421 are within an area between the opening 425 and the reference chart unit 400 and are symmetrically arranged with respect to the sensor unit 430. In other words, a line obtained by connecting the two LEDs used as the illumination light source 426 passes through the center of the imaging lens 432 of the sensor unit 430, and the opening 425 provided to the bottom surface 421a of the housing 421 and the reference chart unit 400 are arranged at line-symmetric positions with respect to the line obtained by connecting the two LEDs. It is possible to illuminate the subject (patch image 200) and the reference chart unit 400 under nearly the same conditions by arranging the two LEDs used as the illumination light source 426 in this manner.

To illuminate the subject (patch image 200) outside of the housing 421 under the same illumination conditions as those for the reference chart unit 400 arranged inside of the housing 421, it is necessary to illuminate the subject (patch image 200) only with the illumination light from the illumination light source 426 while preventing the subject (patch image 200) from being irradiated with outside light when the sensor unit 430 captures the subject (patch image 200). To prevent the subject (patch image 200) from being irradiated with outside light, it is effective that the gap d between the bottom surface 421a of the housing 421 and the recording medium 16 is made small such that the housing 421 blocks outside light toward the subject (patch image 200). However, if the gap d between the bottom surface 421a of the housing 421 and the recording medium 16 is made too small, the recording medium 16 may come into contact with the bottom surface 421a of the housing 421, and as a result, there is a possibility that the image fails to be captured properly. Therefore, in consideration of the planarity of the recording medium 16, it is desirable that the gap d between the bottom surface 421a of the housing 421 and the recording medium 16 be set to a small value within the range where the recording medium 16 does not come into contact with the bottom surface 421a of the housing 421. If the gap d between the bottom surface 421a of the housing 421 and the recording medium 16 is set to approximately 1 mm to 2 mm, for example, the recording medium 16 does not come into contact with the bottom surface 421a of the housing 421, and it is possible to effectively prevent the subject (patch image 200) formed on the recording medium 16 from being irradiated with outside light.

To irradiate the subject (patch image 200) with the illumination light from the illumination light source 426 properly, it is preferable that the size of the opening 425 provided to the bottom surface 421a of the housing 421 be made larger than that of the subject (patch image 200), so that, no shadow generated by an edge of the opening 425 blocking the illumination light is projected on the subject (patch image 200).

If the gap d between the bottom surface 421a of the housing 421 and the recording medium 16 is made small, a difference between a light path length from the sensor unit 430 to the subject (patch image 200) and a light path length from the sensor unit 430 to the reference chart unit 400 falls within a range of a depth of field of the sensor unit 430. The image capturing unit 42 of the present embodiment is configured to simultaneously capture the subject (patch image 200) outside the housing 421 and the reference chart unit 400 arranged inside the housing 421 in the sensor unit 430. Therefore, when the difference between the light path length from the sensor unit 430 to the subject (patch image 200) and the light path length from the sensor unit 430 to the reference chart unit 400 exceeds the range of the depth of field of the sensor unit 430, it is not possible to capture an image focusing on both the subject (i.e. patch image 200) and the reference chart unit 400.

The difference between the light path length from the sensor unit 430 to the subject (i.e. patch image 200) and the light path length from the sensor unit 430 to the reference chart unit 400 is nearly a value acquired by adding a gap "d" to a thickness of the bottom surface 421a of the housing 421. Therefore, when the gap "d" is set to a sufficiently small value, the difference between the light path length from the sensor unit 430 to the subject (i.e. patch image 200) and the light path length from the sensor unit 430 to the reference chart unit 400 can be set within the range of the depth of field of the sensor unit 430, and it becomes possible to capture an image focusing on both the subject (i.e. patch image 200) and the reference chart unit 400. For instance, if the gap d is set to approximately 1 mm to 2 mm, the difference between the light path length from the sensor unit 430 to the subject (patch image 200) and the light path length from the sensor unit 430 to the reference chart unit 400 is within the range of the depth of field of the sensor unit 430.

Furthermore, the depth of field of the sensor unit 430 is a characteristic unique to the sensor unit 430, which is determined based on an aperture value of the sensor unit 430, a focal length of the imaging lens 432, a distance between the sensor unit 430 and the subject, and so on. In the image capturing unit 42 according to the present embodiment, when the gap "d" between the bottom surface 421a of the housing 421 and the recording medium 16 is set to a sufficiently small value around 1 mm to 2 mm, the sensor unit 430 is designed such that a difference between the light path length from the sensor unit 430 to the subject (i.e. patch image 200) and the light path length from the sensor unit 430 to the reference chart unit 400 is within the range of the depth of field.

Specific Example of Reference Chart Unit

Figure 5:
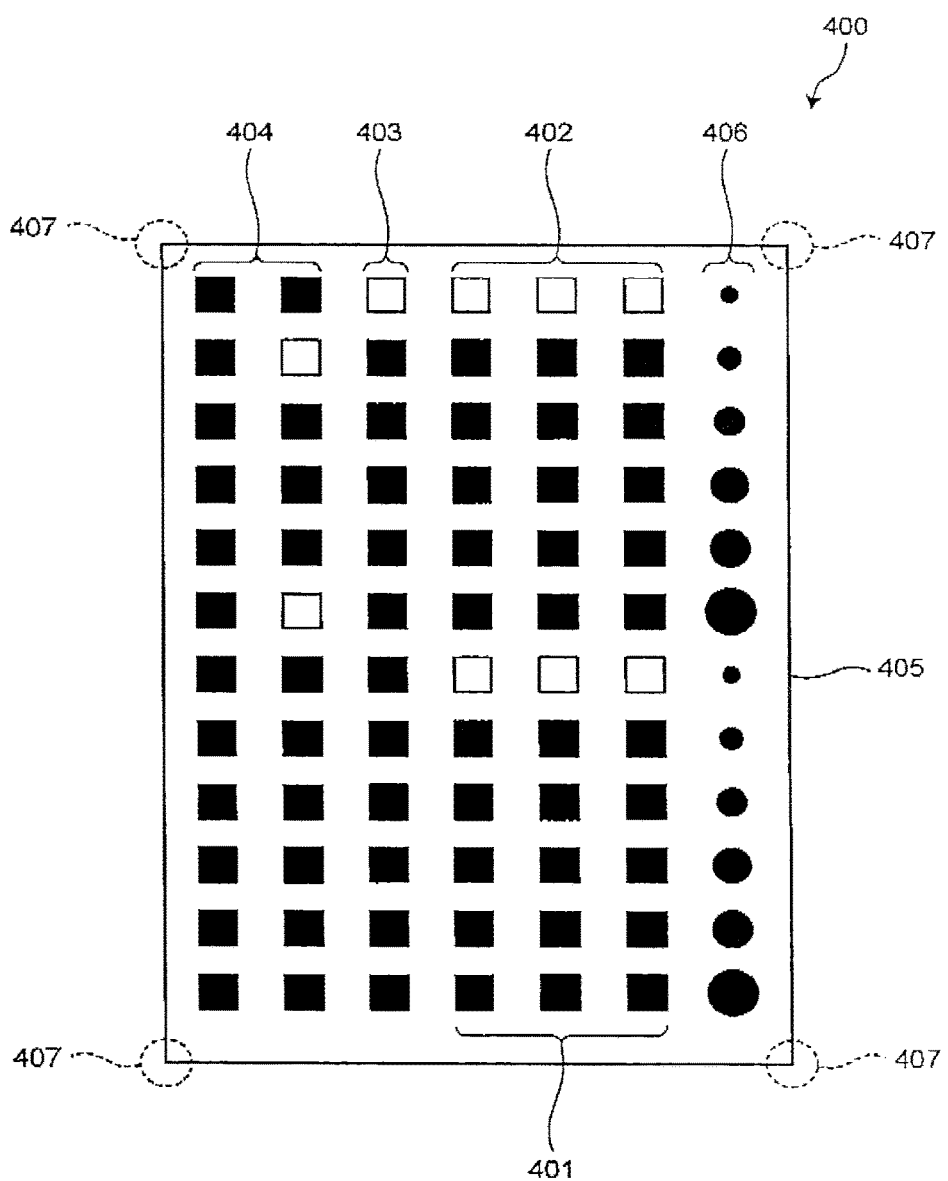
FIG. 5 is a view of a specific example of a reference chart unit.

Next, with reference to FIG. 5, the reference chart unit 400 on the chart plate 410 arranged inside the housing 421 of the image capturing unit 42 will be described in detail. FIG. 5 is a view of a specific example of the reference chart unit 400.

The reference chart unit 400 illustrated in FIG. 5 has a plurality of reference patch arrays 401 to 404 for color measurement in which patches for color measurement are arranged, a dot diameter measurement pattern array 406, a distance measurement line 405, and chart position specification markers 407.

The reference patch arrays 401 to 404 include the reference patch array 401 in which patches in primary colors of YMC are arranged in order of scale, the reference patch array 402 in which patches in secondary colors of RGB are arranged in order of scale, the reference patch array (achromatic scale patterns) 403 in which patches of a gray scale are arranged in order of scale, and the reference patch array 404 in which patches in tertiary colors are arranged. The dot diameter measurement pattern array 406 is a pattern array for geometric configuration measurement in which circular patterns in different sizes are arranged in order of size.

The distance measurement line 405 is formed as a rectangular frame (combination of a pair of main scanning distance reference lines and a pair of sub-scanning distance references lines) surrounding the multiple reference patch arrays 401 to 404 and the dot diameter measurement pattern array 406. The chart position specification markers 407 are markers provided at four corners of the distance measurement line 405 to specify each patch position. The position of the reference chart unit 400 and the position of each pattern can be specified by specifying the distance measurement line 405 and the chart position specification markers 407 at four corners thereof from image data of the reference chart unit 400 acquired by capturing the reference chart unit 400 by the image capturing unit 42.

Each patch forming the reference patch arrays 401 to 404 for color measurement is used as a specific color criterion reflecting image-capturing conditions at the time the image capturing unit 42 captures an image. The configuration of the reference patch arrays 401 to 404 for color measurement arranged in the reference chart unit 400 is not limited to the arrangement example illustrated in FIG. 5, and an arbitrary patch array can be used. For example, patches capable of specifying the color range as wide as possible may be used, or the reference patch array 401 in the primary colors of YMCK or the reference patch array 403 of the gray scale may be formed with patches having the color measurement values of the ink used in the image forming apparatus 100. Further, the reference patch array 402 in the secondary colors of RGB may be formed with patches having the color measurement values that can produce color by the ink used in the image forming apparatus 100. Still further, it may be possible to use a standard color chart for which color measurement values are defined, such as Japan Color.

In the present embodiment, the reference chart unit 400 including the reference patch arrays 401 to 404 having a general patch (chart) shape is used, but the reference chart unit 400 does not necessarily need to be in a mode including the reference patch arrays 401 to 404. The reference chart unit 400 merely needs to be configured such that multiple colors that can be used for color measurement can specify the respective positions.

The reference chart unit 400 is arranged in the bottom surface 421a of the housing 421 of the image capturing unit 42 so as to be adjacent to the opening 425, and therefore it is possible to image it and a subject such as the patch image 200 by the sensor unit 430 at the same time.

Schematic Configuration of Control Mechanism of Image Forming Apparatus

Figure 6:
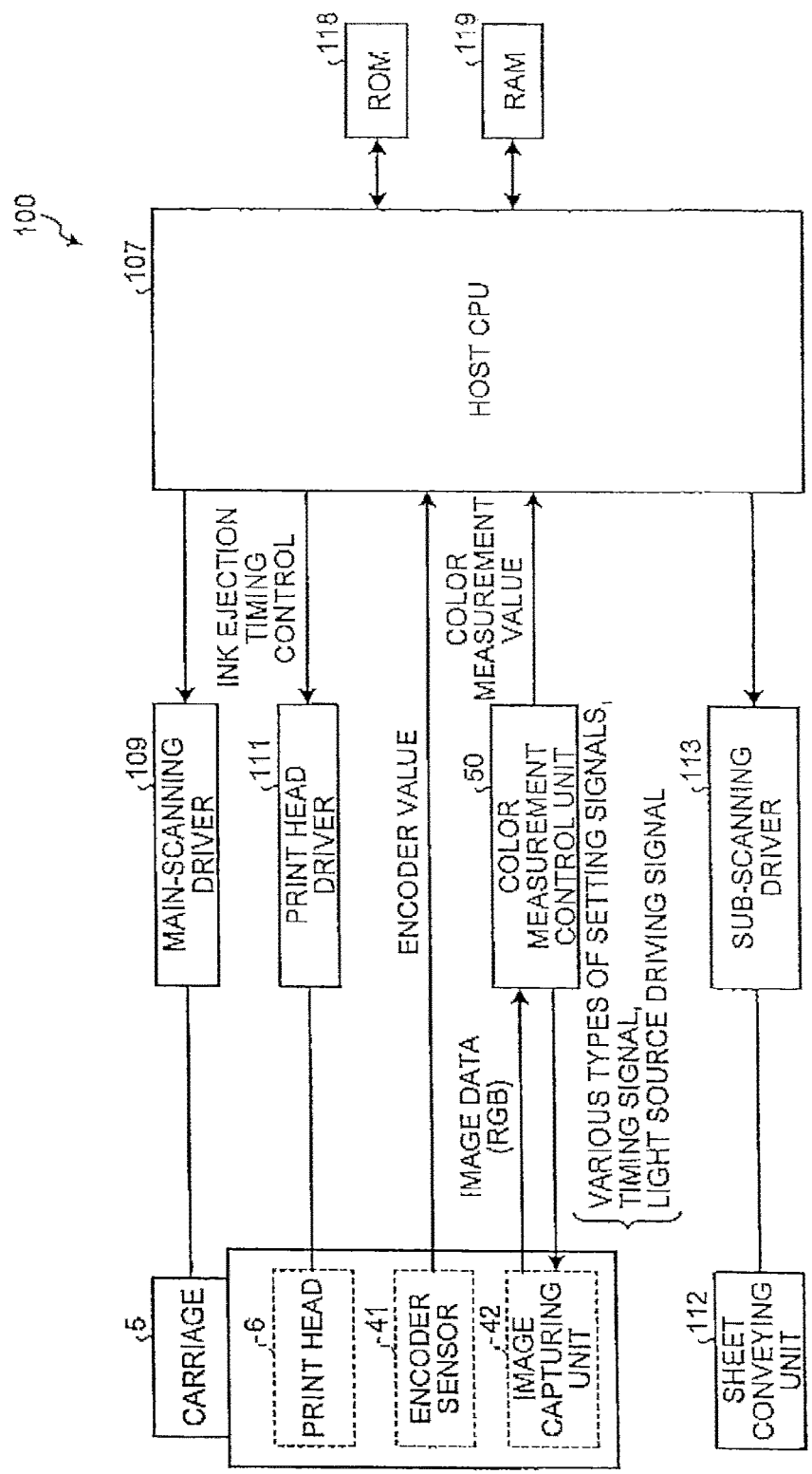
FIG. 6 is a block diagram of a schematic configuration of a control mechanism of the image forming apparatus.

Next, a schematic configuration of a control mechanism of the image forming apparatus 100 according to the present embodiment will be described with reference to FIG. 6. FIG. 6 is a block diagram illustrating the schematic configuration of the control mechanism of the image forming apparatus 100.

The control mechanism of the image forming apparatus 100 according to the present embodiment includes a host CPU 107, a ROM 118, a RAM 119, a main-scanning driver 109, a print head driver 111, a color measurement control unit 50, a sheet conveying unit 112, a sub-scanning driver 113, the print head 6, the encoder sensor 41 and the image capturing unit 42. The print head 6, the encoder sensor 41, and the image capturing unit 42 are mounted on the carriage 5 as described above.

The host CPU 107 supplies data of an image to be formed on the recording medium 16 and a drive control signal (pulse signal) to each driver to control the entire image forming apparatus 100. Specifically, the host CPU 107 controls drive of the carriage 5 in the main-scanning direction via the main-scanning driver 109. The host CPU 107 controls the ink ejection timing of the print head 6 via the print head driver 111. The host CPU 107 controls drive of the sheet conveying unit 112 including carriage rollers and a sub-scanning motor via the sub-scanning driver 113.

The encoder sensor 41 outputs an encoder value obtained by detecting a mark of the encoder sheet 40 to the host CPU 107. Based on the encoder value from the encoder sensor 41, the host CPU 107 controls drive of the carriage 5 in the main-scanning direction via the main-scanning driver 109.

As described above, at the time of color measurement of the patch image 200 formed on the recording medium 16, the image capturing unit 42 captures the patch image 200 and the reference chart unit 400 on the chart plate 410 arranged inside the housing 421 at the same time and outputs image data of the patch image 200 and the reference chart unit 400 to the color measurement control unit 50.

Based on the image data of the patch image 200 and the reference chart unit 400 acquired from the image capturing unit 42, the color measurement control unit 50 calculates the color measurement value of the patch image 200 (i.e. color specification value in the standard color space). The color measurement value of the patch image 200 calculated by the color measurement control unit 50 is transmitted to the host CPU 107. The color measurement control unit 50 and the image capturing unit 42 form the color measuring device. In the present embodiment, the color measurement control unit 50 is configured to be separated from the image capturing unit 42, but the color measurement control unit 50 may be integrally configured with the image capturing unit 42. For instance, a control circuit, which functions as the color measurement control unit 50, may be mounted on the board 423 of the image capturing unit 42.

The color measurement control unit 50 supplies various types of setting signals, a timing signal, a light source driving signal, and the like to the image capturing unit 42, and controls image capturing performed by the image capturing unit 42. The various types of setting signals include a signal for setting an operation mode of the sensor unit 430, and a signal for setting image-capturing conditions such as the shutter speed and a gain in AGC. The color measurement control unit 50 acquires these setting signals from the host CPU 107 and supplies the signals to the image capturing unit 42. The timing signal is a signal for controlling the timing of image capturing performed by the sensor unit 430 and the light source driving signal is a signal for controlling drive of the illumination light source 426 that illuminates the image-capturing range of the sensor unit 430. The color measurement control unit 50 generates the timing signal and the light source driving signal, and supplies these signals to the image capturing unit 42.

The ROM 118 stores therein a computer program of an operating process executed by the host CPU 107 and various types of control data, for example. The RAM 119 is used as a working memory for the host CPU 107.

Configuration of Control Mechanism of Color Measuring Device

Figure 7:
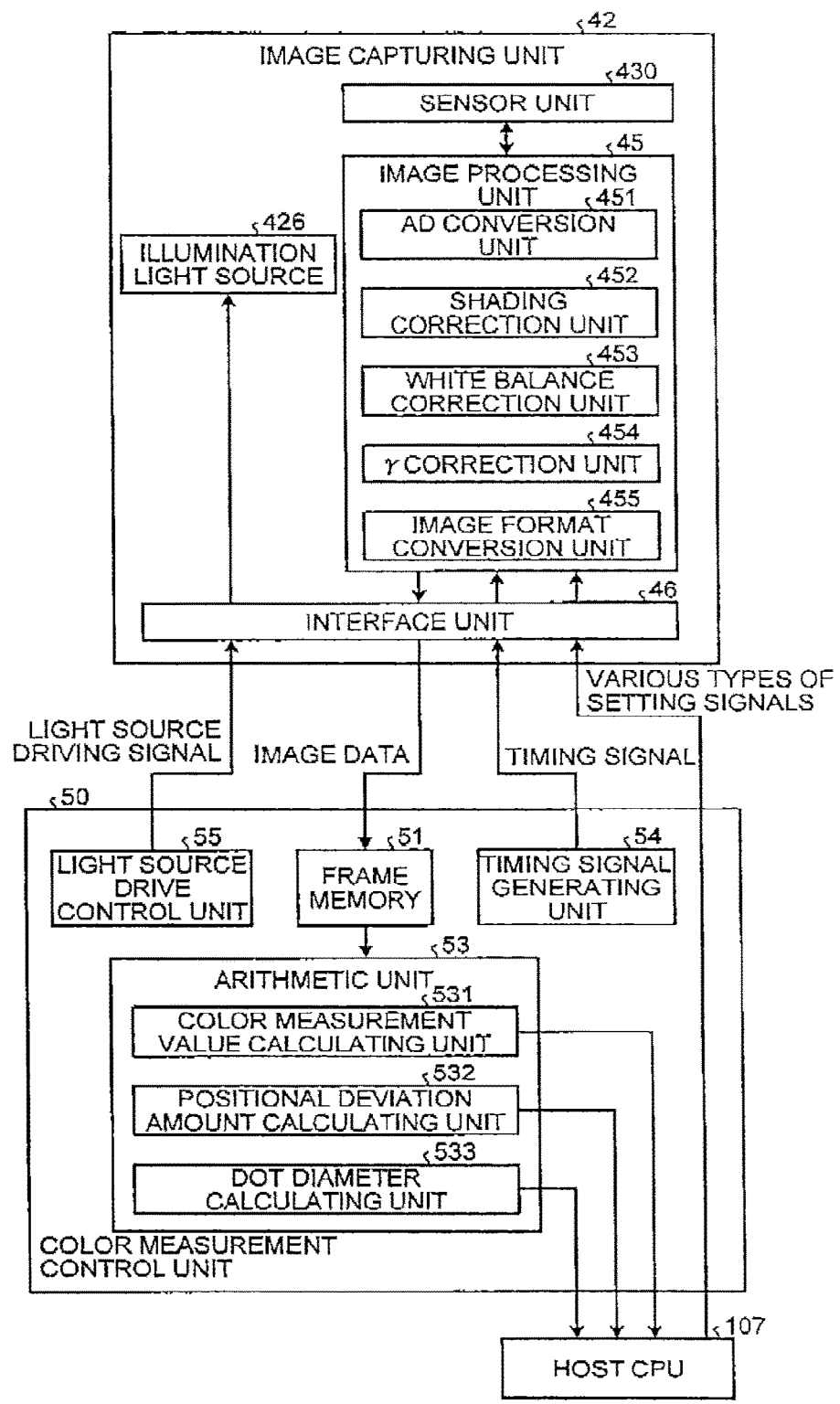
FIG. 7 is a block diagram illustrating a configuration example of a control mechanism of a color measuring device.

Next, a control mechanism of the color measuring device according to the present embodiment will be described in detail with reference to FIG. 7. FIG. 7 is a block diagram illustrating a configuration example of the control mechanism of the color measuring device.

The color measuring device includes the image capturing unit 42 and the color measurement control unit 50. The image capturing unit 42 includes an image processing unit 45 and an interface unit 46 in addition to the above sensor unit 430 and the illumination light source 426. In the present embodiment, the image processing unit 45 is configured to be separated from the sensor unit 430, but the function of the image processing unit 45 may be provided to the two-dimensional image sensor 431 of the sensor unit 430.

The image processing unit 45 processes image data captured by the sensor unit 430 and includes an AD conversion unit 451, a shading correction unit 452, a white balance correction unit 453, a γ correction unit 454, and an image format conversion unit 455.

The AD conversion unit 451 converts an analog signal output by the sensor unit 430 to a digital signal.

The shading correction unit 452 corrects an error in the image data caused by illuminance unevenness in the illumination provided by the illumination light source 426 to the image-capturing range of the sensor unit 430.

The white balance correction unit 453 corrects a white balance of the image data.

The γ correction unit 454 corrects image data so as to compensate the linearity of sensitivity of the sensor unit 430.

The image format conversion unit 455 converts image data into an arbitrary format.

The interface unit 46 is an interface by which the image capturing unit 42 acquires the various types of setting signals, the timing signal, and the light source driving signal supplied from the color measurement control unit 50 and by which the image capturing unit 42 transmits the image data to the color measurement control unit 50.

The color measurement control unit 50 includes a frame memory 51, an arithmetic unit 53, a timing signal generating unit 54, and a light source drive control unit 55.

The frame memory 51 is a memory to temporarily store the image data sent from the image capturing unit 42.

The arithmetic unit 53 includes a color measurement value calculating unit (calculating unit) 531, a positional deviation amount calculating unit 532, and a dot diameter calculating unit 533. The arithmetic unit 53 includes a processor such as a CPU, for example, and each function of the color measurement value calculating unit 531, the positional deviation amount calculating unit 532, and the dot diameter calculating unit 533 is implemented when the processor executes a predetermined program. In the present embodiment, the color measurement value calculating unit 531, the positional deviation amount calculating unit 532, and the dot diameter calculating unit 533 of the arithmetic unit 53 are implemented by software, but may be partially or entirely implemented using dedicated hardware such as ASIC (Application Specific Integrated Circuit), FPGA (Field-Programmable Gate Array), and the like.

When the sensor unit 430 of the image capturing unit 42 captures the patch image 200 of a color measurement target and the reference chart unit 400 at the same time, the color measurement value calculating unit 531 calculates the color measurement value of the patch image 200 based on the image data of the patch image 200 and the reference chart unit 400 acquired by the image capturing. The color measurement value of the patch image 200 calculated by the color measurement value calculating unit 531 is transmitted to the host CPU 107. Also, a specific example of processing by the color measurement value calculating unit 531 will be described later in detail.

When the image forming apparatus 100 outputs a predetermined image for positional deviation measurement to the recording medium 16 and when the sensor unit 430 of the image capturing unit 42 captures the reference chart unit 400 arranged inside the housing 421 and the image for positional deviation measurement output by the image forming apparatus 100 at the same time, the positional deviation amount calculating unit 532 calculates the amount of positional deviation in the image output by the image forming apparatus 100 based on the image data of the image for positional deviation measurement and the image data of the reference chart unit 400 acquired by the image capturing. The amount of positional deviation in the image calculated by the positional deviation amount calculating unit 532 is transmitted to the host CPU 107. A specific example of the processing performed by the positional deviation amount calculating unit 532 will be described later in detail.

When the image forming apparatus 100 outputs a predetermined image for dot diameter measurement to the recording medium 16 and when the sensor unit 430 of the image capturing unit 42 captures the reference chart unit 400 arranged inside the housing 421 and the image for dot diameter measurement output by the image forming apparatus 100 at the same time, the dot diameter calculating unit 533 calculates the dot diameter in the image output by the image forming apparatus 100 based on the image data of the image for dot diameter measurement and the image data of the reference chart unit 400 acquired by the image capturing. The dot diameter in the image calculated by the dot diameter calculating unit 533 is transmitted to the host CPU 107. A specific example of the processing performed by the dot diameter calculating unit 533 will be described later in detail.

The timing signal generating unit 54 generates a timing signal that controls the timing of image capturing performed by the sensor unit 430 of the image capturing unit 42, and supplies the timing signal to the image capturing unit 42.

The light source drive control unit 55 generates a light source driving signal for driving the illumination light source 426 of the image capturing unit 42, and supplies the light source driving signal to the image capturing unit 42.

Color Measurement Method of Patch Image

Figure 11:
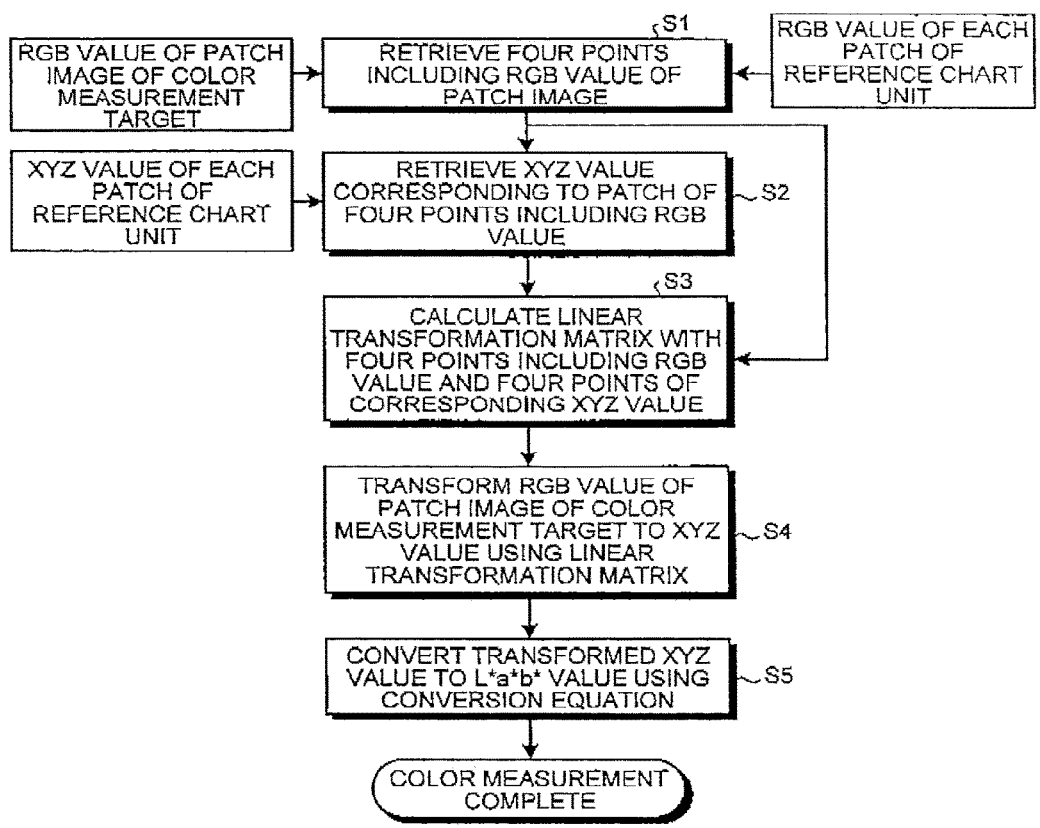
FIG. 11 is a flowchart illustrating color measurement steps for a patch image.
Figure 12:
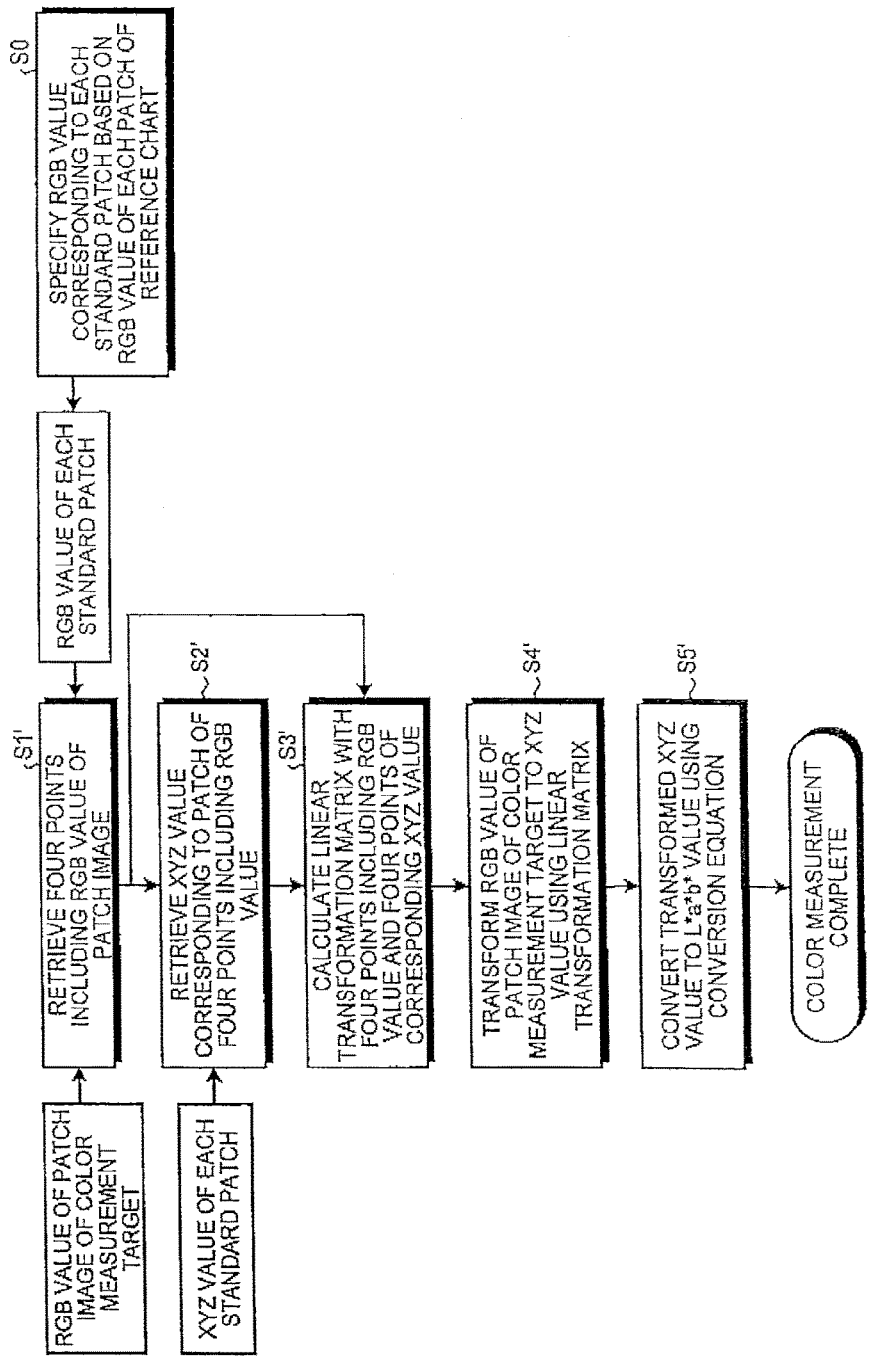
FIG. 12 is a flowchart illustrating a modification of color measurement steps for a patch image.
Figure 13:
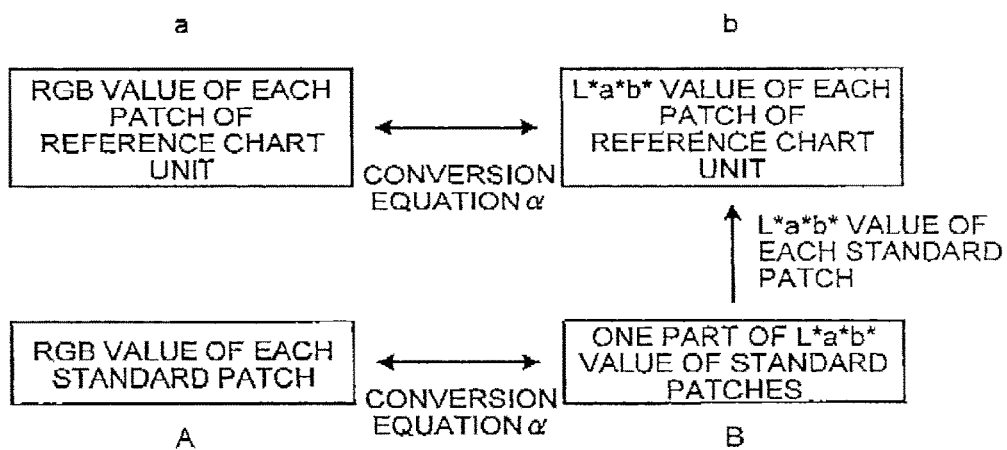
FIG. 13 is a view explaining a method of specifying an RGB value corresponding to the L*a*b* value of each standard patch.

Next, a specific example of the color measurement method of the patch image 200 using the color measuring device will be explained in detail with reference to FIGS. 8 to 13. FIG. 8 is a view illustrating an example of image data acquired by capturing the patch image 200 of a color measurement target and the reference chart unit 400 in the sensor unit 430 at the same time. FIG. 9 is a view explaining a specific example of a color measurement method of the patch image 200. FIGS. 10A and 10B are views illustrating a conversion equation to perform conversion between an L*a*b* value and an XYZ value. FIG. 11 is a flowchart illustrating color measurement steps for the patch image 200. FIG. 12 is a flowchart illustrating a modification of color measurement steps for the patch image 200. FIG. 13 is a view explaining a method of specifying an RGB value corresponding to the L*a*b* value of each standard patch.

To perform color measurement on the patch image 200, first, the image forming apparatus 100 outputs an arbitrary patch to the recording medium 16 to form the patch image 200. Subsequently, the sensor unit 430 included in the image capturing unit 42 of the color measuring device captures the patch image 200 of the color measurement target with the reference chart unit 400 on the chart plate 410 arranged inside the housing 421 of the image capturing unit 42. As a result, the image data of the patch image 200 and the reference chart unit 400 as illustrated in FIG. 8 is acquired, for example. The image-capturing range of the sensor unit 430 has a reference chart capturing area in which the reference chart unit 400 is captured and a subject image-capturing area in which the patch image 200 serving as the subject of the color measurement target is captured. The image data output from the pixels corresponding to the reference chart capturing area is the image data of the reference chart unit 400 and the image data output from the pixels corresponding to the subject image-capturing area is the image data of the patch image 200. Here, although one patch image 200 alone is captured as the subject of the color measurement target, a plurality of patch images 200 may be captured at the same time.

After the image data of the patch image 200 and the reference chart unit 400 captured by the sensor unit 430 is processed by the image processing unit 45, the image data is transmitted from the image capturing unit 42 to the color measurement control unit 50 via the interface unit 46 and stored in the frame memory 51 of the color measurement control unit 50. The color measurement value calculating unit 531 of the arithmetic unit 53 then reads the image data stored in the frame memory 51 and performs color measurement on the patch image 200.

First, by performing pattern matching or the like, the color measurement value calculating unit 531 specifies positions of the chart position specification markers 407 at four corners of the distance measurement line (main scanning/sub-scanning distance reference line) 405 in the reference chart unit 400, from the image data read from the frame memory 51. By this means, it is possible to specify the position of the reference chart unit 400 in the image data. After specifying the position of the reference chart unit 400, the position of each patch in the reference chart unit 400 is specified.

Next, the color measurement value calculating unit 531 uses the image data (RGB value) of each patch in the reference chart unit 400, thereby converting the image data (RGB value) of the patch image 200 of the color measurement target into an L*a*b* value serving as a color specification value in the L*a*b* color space. A specific method of this conversion will now be described in detail.

L*a*b* color space (c) of FIG. 9 is obtained by plotting the L*a*b* value of each patch of the reference patch array 401 in the primary color (YMC) and the reference patch array 402 in the secondary color (RGB) in the reference chart unit 400 illustrated in FIG. 5 on the L*a*b* color space. Here, the L*a*b* value of each patch are calculated in advance as described above, and are stored in a non-volatile memory inside the color measurement control unit 50, for example.

RGB color space (a) of FIG. 9 is obtained by plotting the RGB value (image data obtained by image capturing of the sensor unit 430) of each patch of the reference patch array 401 in the primary color (YMC) and the reference patch array 402 in the secondary color (RGB) in the reference chart unit 400 illustrated in FIG. 5 on the RGB color space.

XYZ color space of (b) of FIG. 9 is obtained by converting the L*a*b* value illustrated in FIG. 9(c) into the XYZ value using a predetermined conversion equation, and by plotting the XYZ value thus converted on the XYZ color space. The L*a*b* value can be converted into the XYZ value by using the conversion equation illustrated as FIG. 10B (Lab⇒XYZ). By contrast, the XYZ value can be converted into the L*a*b* value by using the conversion equation illustrated as FIG. 10A (XYZ⇒Lab). In other words, the L*a*b* value of L*a*b* colorspace (c) illustrated in FIG. 9 and the XYZ value of XYZ color space (b) illustrated in FIG. 9 can be interconverted by using the conversion equations illustrated in FIGS. 10A and 10B.

Here, an explanation will be given to the process for converting the RGB value of the patch image 200 of the color measurement target acquired from the subject image-capturing area illustrated in FIG. 8, into the L*a*b* value with reference to the flowchart of FIG. 11. An assumption is made that the RGB value of the patch image 200 of the color measurement target is present on a point Prgb on the RGB color space (a) illustrated in FIG. 9. In this case, first, four points in the nearest neighborhood capable of forming a tetrahedron including the point Prgb are retrieved among the RGB values of the patches in the reference chart unit 400 illustrated in FIG. 8 (step S1). In the example of the RGB color space (a) of FIG. 9, four points p0, p1, p2, and p3 are selected. Here, it is assumed that the coordinate values of the four points p0, p1, p2, and p3 in the RGB color space (a) illustrated in FIG. 9 are represented by p0 (x01, x02, x03), p1 (x1, x2, x3), p2 (x4, x5, x6) and p3 (x7, x8, x9), respectively.

Next, four points q0, q1, q2 and q3 in the XYZ color space (b) illustrated in FIG. 9 corresponding to the four points p0, p1, p2 and p3 in the RGB color space (a) illustrated in FIG. 9 are retrieved (step S2). It is assumed that the coordinate values of the four points q0, q1, q2 and q3 in the XYZ color space are represented by q0 (y01, y02, y03), q1 (y1, y2, y3), q2 (y4, y5, y6) and q3 (y7, y8, y9), respectively.

Next, a linear transformation matrix for linearly transforming the local space in the tetrahedron is calculated (step S3). To be more specific, an arbitrary pair of corresponding points (p0 and q0 closest to an achromatic color in the present embodiment) is determined among the four points p0, p1, p2 and p3 in the RGB color space, and the corresponding points (p0, q0) are determined as origin (the coordinate values of p1 to p3 and q1 to q3 are represented by relative values with respect to p0 and q0).

If it is assumed that the conversion equation between spaces of the RGB color space (a) illustrated in FIG. 9 and the XYZ color space (b) illustrated in FIG. 9 can be linearly transformed into Y=AX, the equation is represented by following Equation (1):

$$Y = \begin{pmatrix} a11 & a12 & a13 \\ a21 & a22 & a23 \\ a31 & a32 & a33 \end{pmatrix} X \qquad (1)$$

where X is a point in the RGB space and Y is a point in the XYZ space.

Here, if it is assumed that p1 is mapped into q1, p2 is mapped into q2 and p3 is mapped into q3, each factor "a" can be calculated by following Equations (2) to (10):

$$a13 = \frac{(x4y1 - x1y4)(x2x7 - x1x8) - (x7y1 - x1y7)(x2x4 - x1x5)}{(x3x4 - x1x6)(x2x7 - x1x8) - (x3x7 - x1x9)(x2x4 - x1x5)} \qquad (2)$$

$$a23 = \frac{(x4y2 - x1y5)(x2x7 - x1x8) - (x7y2 - x1y8)(x2x4 - x1x5)}{(x3x4 - x1x6)(x2x7 - x1x8) - (x3x7 - x1x9)(x2x4 - x1x5)} \qquad (3)$$

$$a33 = \frac{(x4y3 - x1y6)(x2x7 - x1x8) - (x7y3 - x1y9)(x2x4 - x1x5)}{(x3x4 - x1x6)(x2x7 - x1x8) - (x3x7 - x1x9)(x2x4 - x1x5)} \qquad (4)$$

$$a12 = \frac{(x4y1 - x1y4)(x3x7 - x1x4) - (x7y1 - x1y7)(x3x4 - x1x6)}{(x2x4 - x1x5)(x3x7 - x1x9) - (x2x7 - x1x8)(x3x4 - x1x6)} \qquad (5)$$

$$a22 = \frac{(x4y2 - x1y5)(x3x7 - x1x9) - (x7y2 - x1y8)(x3x4 - x1x6)}{(x2x4 - x1x5)(x3x7 - x1x9) - (x2x7 - x1x8)(x3x4 - x1x6)} \qquad (6)$$

$$a32 = \frac{(x4y3 - x1y6)(x3x7 - x1x9) - (x7y3 - x1y9)(x3x4 - x1x6)}{(x2x4 - x1x5)(x3x7 - x1x9) - (x2x7 - x1x8)(x3x4 - x1x6)} \qquad (7)$$

$$a11 = \frac{y1 - a12x1 - a13x3}{x1} \qquad (8)$$

$$a21 = \frac{y2 - a22x2 - a23x3}{x1} \qquad (9)$$

$$a31 = \frac{y3 - a32x2 - a33x3}{x1} \qquad (10)$$

Next, using this linear transformation matrix (Y=AX), the point Prgb (whose coordinate value is (Pr, Pg, Pb)) representing the RGB value of the patch image 200 of the color measurement target in the RGB color space (a) illustrated in FIG. 9 is mapped into the XYZ color space (b) illustrated in FIG. 9 (step S4). The acquired XYZ value is a relative value with respect to the origin q0. Therefore, the actual XYZ value Pxyz (whose coordinate value is (Px, Py, Pz)) corresponding to the RGB value Prgb of the patch image 200 of the color measurement target is represented as an offset value with respect to the origin q0 (y01, y02, y03) by following Equations (11) to (13):

$$Px = y01 + a11 \times Pr + a12 \times Pg + a13 \times Pb \qquad (11)$$

$$Py = y02 + a21 \times Pr + a22 \times Pg + a23 \times Pb \qquad (12)$$

$$Pz = y03 + a31 \times Pr + a32 \times Pg + a33 \times Pb \qquad (13)$$

Next, the XYZ value Pxyz of the patch image 200 calculated as above is converted into the L*a*b* value by the conversion equation illustrated in FIG. 10A, thereby calculating the L*a*b* value corresponding to the RGB value Prgb of the patch image 200 of the color measurement target (step S5). By this means, even if the sensitivity of the sensor unit 430 changes or the wavelength or intensity of the illumination light source 426 changes, it is possible to accurately calculate the color measurement value of the patch image 200 of the color measurement target and perform color measurement with high accuracy. Also, in the present embodiment, although the patch image 200 formed by the image forming apparatus 100 is the target for color measurement, an arbitrary image output by the image forming apparatus 100 may be a target for color measurement. For example, the image forming apparatus 100 can output an image while performing color measurement on a part of the image, thereby adjusting the output characteristics of the image forming apparatus 100 in real time.

Also, the L*a*b* color space (c) of FIG. 9 used in the above processing operations is obtained by plotting the L*a*b* value of each patch of the reference patch array 401 in the primary color (YMC) and the reference patch array 402 in the secondary color (RGB) in the reference chart unit 400 illustrated in FIG. 5, on the L*a*b* color space. Since the reference chart unit 400 illustrated in FIG. 5 is formed on the chart plate 410 arranged in the housing 421 of the image capturing unit 42, the number of patches constituting the reference chart unit 400 is restricted. Therefore, the reference chart unit 400 illustrated in FIG. 5 is formed using a part of patches selected from the standard patches. Japan Color has 928 colors, for example, and the reference chart unit 400 illustrated in FIG. 5 is formed using a part (e.g., 72 colors) selected from the 928 colors. However, in a case where color measurement is performed using a part of patches selected from the standard patches alone, it is concerned that the accuracy in the color measurement degrades. Therefore, it is preferable to analogize the RGB values of the standard patches from the RGB values of the patches constituting the reference chart unit 400 and perform color measurement on the patch image 200 of the color measurement target using the RGB values of the standard patches.

Specifically, the L*a*b* values of the standard patches are stored, and, as illustrated in FIG. 12, the RGB value corresponding to each standard patch is specified based on the RGB value of each patch in the reference chart unit 400 acquired by image capturing in the sensor unit 430 (step S0). Based on the specified RGB value of each standard patch, four points including the RGB value of the patch image 200 of the color measurement target are retrieved (step S1').

As illustrated in FIG. 13, the RGB value "a" of each patch of the reference chart unit 400 corresponds to the L*a*b* value "b" of each patch of the reference chart unit 400 by a conversion equation α (b=a×α). Therefore, based on the RGB value of each patch constituting the reference chart unit 400, the equation α is calculated. Furthermore, the L*a*b* value of each patch of the reference chart unit 400 is a part of the L*a*b* values of the standard patches. Thus, the RGB value "A" of each standard patch corresponds to the L*a*b* value "B" of each standard patch by the conversion equation α (B=A×α). Therefore, based on the conversion equation α thus calculated, the RGB value corresponding to the L*a*b* value of each standard patch can be specified. As a result, based on the RGB value of each patch in the reference chart unit 400, it is possible to specify the RGB value corresponding to the L*a*b* value of each standard patch.

Next, based on the XYZ value corresponding to the L*a*b* value of each standard patch, the XYZ values corresponding to patches at four points including the RGB value of the patch image 200 of the color measurement target are retrieved (step S2').

Next, based on the XYZ values corresponding to the four points retrieved in step S2', a linear transformation matrix is calculated (step S3'). Based on the calculated linear transformation matrix, the RGB value of the patch image 200 of the color measurement target is converted into the XYZ value (step S4'). Next, the XYZ value converted in step S4' is converted into the L*a*b* value using the above conversion equation (step S5'). By this means, based on the RGB value and XYZ value of each standard patch, the L*a*b* value of the patch image 200 of the color measurement target can be acquired, and therefore it is possible to perform color measurement on the patch image 200 with high accuracy. Also, it is to be noted that the standard patches are not limited to Japan Color. Alternatively, for example, standard colors, such as SWOP employed in the United States and Euro Press employed in Europe, can be used.

Meanwhile, the image forming apparatus 100 according to the present embodiment forms an image on the recording medium 16 by a dot matrix, and reproduces a desired color by superimposing ink of YMCK, for example. However, if positional deviation occurs in the image, the image deteriorates, and the color measurement value itself obtained from the patch image 200 changes.

In the case where the color of the image changes because of positional deviation in the image formed on the recording medium 16, if the color of the image is to be corrected only by the ejection amount of ink, the balance between the ejection amounts of ink is disturbed and an excellent image fails to be formed. Therefore, it is desirable that the positional deviation in the image be measured and corrected before the color measurement is performed on the patch image 200.

Method for Measuring Positional Deviation in Image

Figure 14:
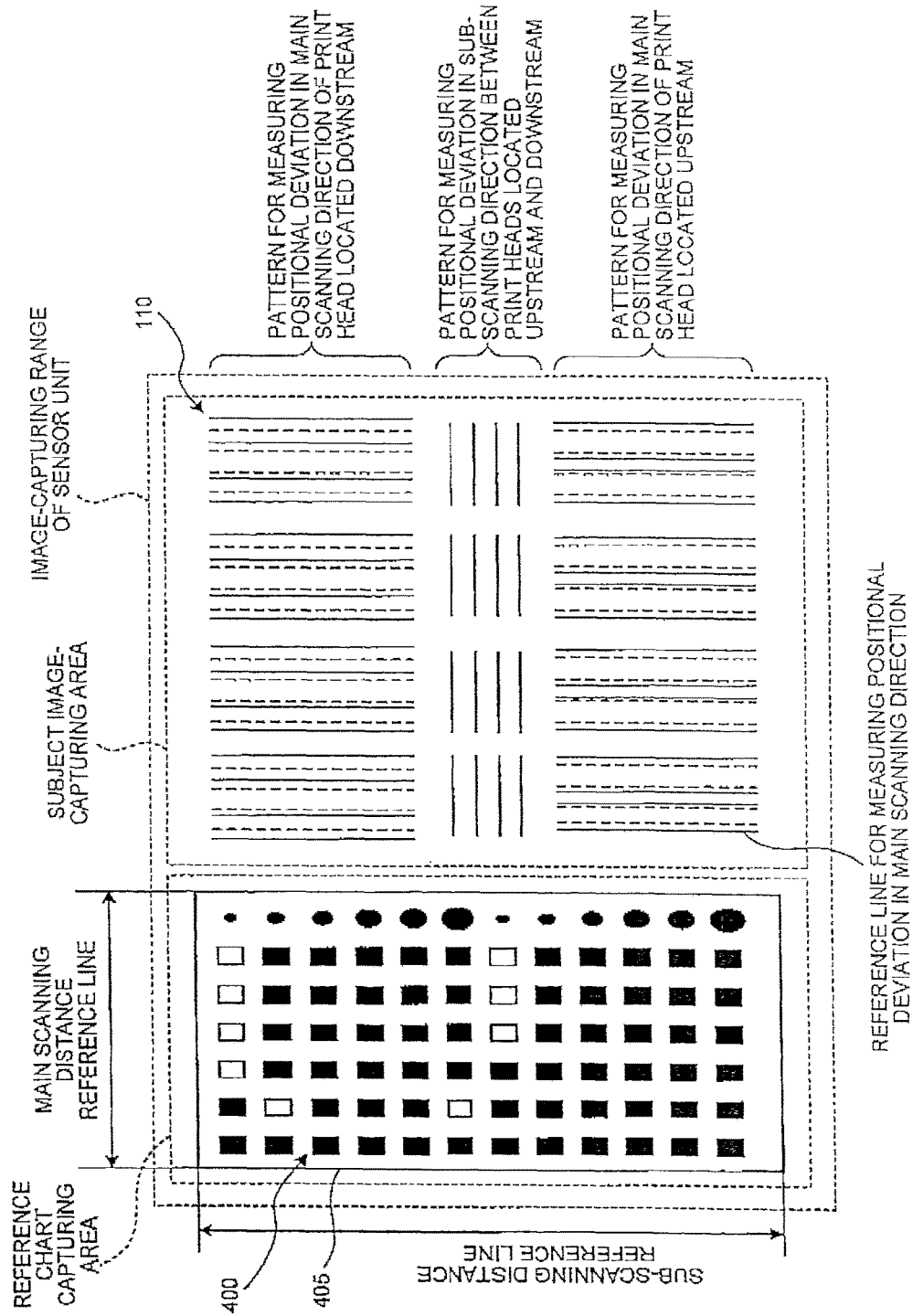
FIG. 14 is a view illustrating an example of image data acquired by capturing a test pattern for measuring positional deviation and a reference chart unit in a sensor unit at the same time.
Figure 17:
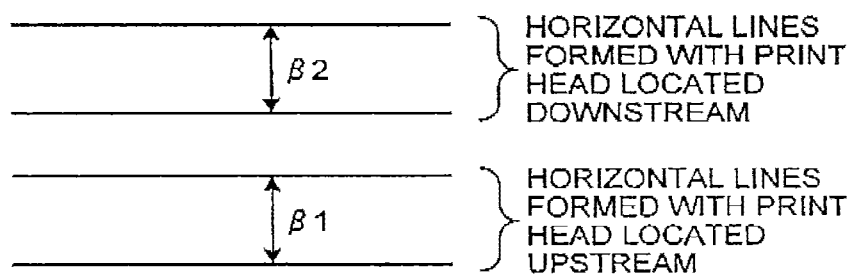
FIG. 17 is a view explaining a method of measuring sub-scanning positional deviation in an image.
Figure 18:
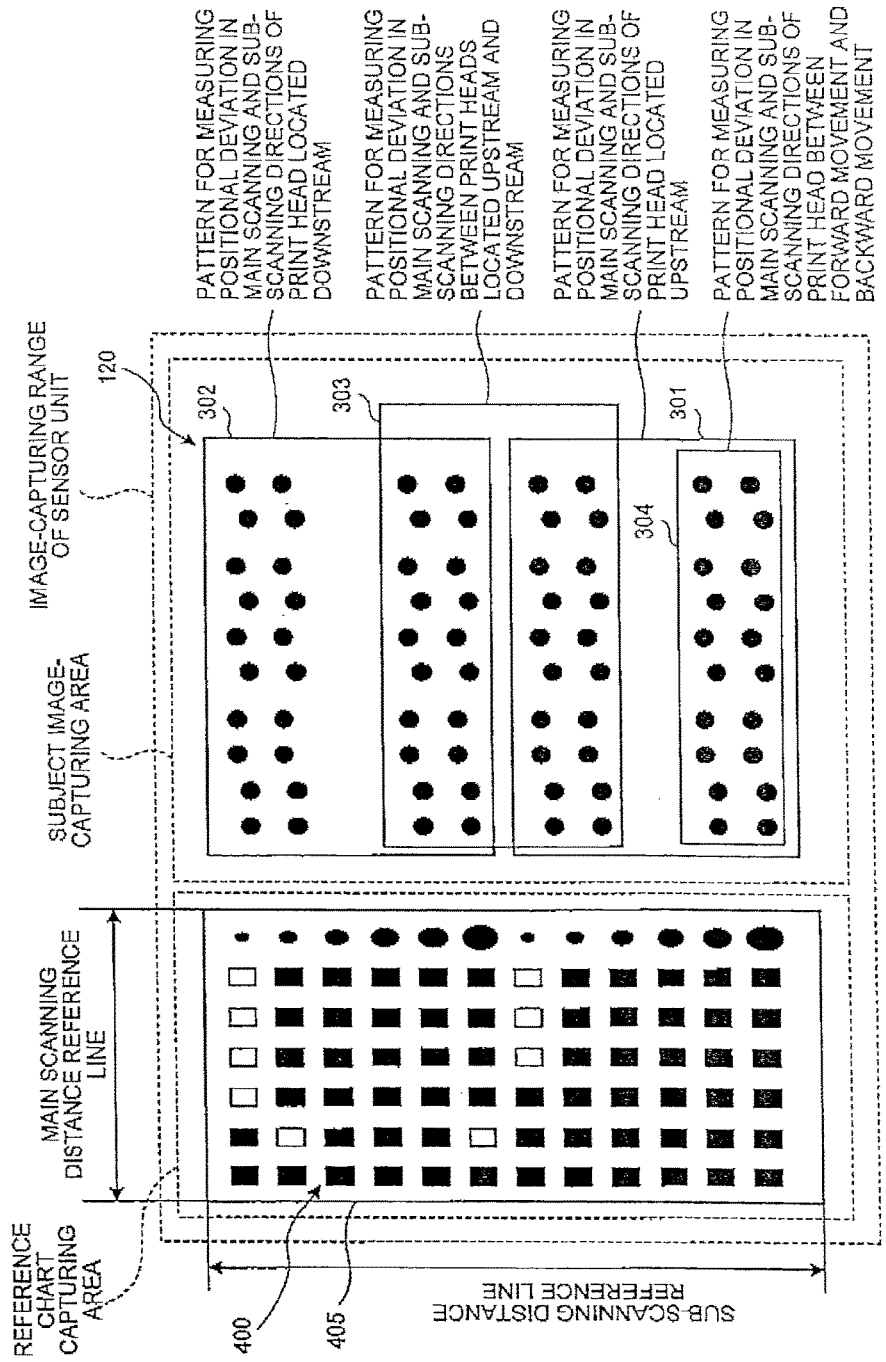
FIG. 18 is a view illustrating an example of image data acquired by capturing a test pattern for measuring positional deviation and the reference chart unit in the sensor unit at the same time.

Next, a specific example of the method for measuring positional deviation in an image using the color measuring device according to the present embodiment will be described in detail with reference to FIG. 14 to FIG. 18. FIG. 14 is a view illustrating an example of image data acquired by capturing a test pattern 110, which is an example of an image for measuring positional deviation, and the reference chart unit 400 in the sensor unit 430 at the same time. FIG. 15 and FIG. 16 are views explaining a method of measuring main-scanning positional deviation in an image. FIG. 17 is a view explaining a method of measuring sub-scanning positional deviation in an image. FIG. 18 is a view illustrating an example of image data acquired by capturing a test pattern 120, which is another example of an image for measuring positional deviation, and the reference chart unit 400 in the sensor unit 430 at the same time.

To measure positional deviation in an image, first, the image forming apparatus 100 forms the predefined test pattern 110, which is an image for measuring positional deviation, on the recording medium 16. Subsequently, the sensor unit 430 included in the image capturing unit 42 of the color measuring device captures the test pattern 110 formed on the recording medium 16 and the reference chart unit 400 at the same time. As a result, the image data including the test pattern 110 and the reference chart unit 400 as illustrated in FIG. 14 is acquired, for example.

After the image data of the test pattern 110 and the reference chart unit 400 captured by the sensor unit 430 is processed by the image processing unit 45, the image data is transmitted from the image capturing unit 42 to the color measurement control unit 50 via the interface unit 46 and stored in the frame memory 51 of the color measurement control unit 50. The positional deviation amount calculating unit 532 of the arithmetic unit 53 then reads the image data stored in the frame memory 51 and measures positional deviation in the image.

Vertical lines (solid lines) in the lower area of the test pattern 110 illustrated in FIG. 14 are patterns for measuring relative positional deviation in the main-scanning direction of the print head 6 located upstream. Vertical lines (solid lines) in the upper area of the test pattern 110 are patterns for measuring relative positional deviation in the main-scanning direction of the print head 6 located downstream. Horizontal lines (solid lines) in the middle of the test pattern 110 are patterns for measuring relative positional deviation in the sub-scanning direction between the print head 6 located upstream and the print head 6 located downstream. Vertical dotted lines in FIG. 14 illustrate the ideal positions of the vertical lines to be recorded on the recording medium 16 when no positional deviation occurs in the main-scanning direction, and are vertical lines that are not actually recorded on the recording medium 16.

The relative positional deviation in the main-scanning direction of the print head 6 located upstream is measured by using the image data of the test pattern 110 captured by the sensor unit 430; measuring gaps between the vertical lines (solid lines) actually formed on the recording medium 16 by shifting the print head 6 by a predetermined gap a; and calculating the difference between the actual positions of the vertical lines (solid lines) formed on the recording medium 16 and the ideal positions of the vertical lines (dotted lines) to be formed on the recording medium 16 when no positional deviation occurs in the main-scanning direction as the amount of positional deviation in the main-scanning direction. The gaps between the vertical lines (solid lines) actually formed on the recording medium 16 are measured by using the black vertical line formed on the leftmost side as a reference line for measuring positional deviation in the main-scanning direction.

Specifically, as illustrated in FIG. 15, by using the first black vertical line formed on the leftmost side as the reference line for measuring positional deviation in the main-scanning direction, gaps (x1, x2, and x3) between the reference line and the vertical lines actually formed are measured. As a result, it is possible to grasp the actual positions of the vertical lines. Subsequently, the difference ($\Delta$x1, $\Delta$x2, and $\Delta$x3) between the actual positions of the vertical lines (solid lines) and the ideal positions of the vertical lines (dotted lines) is measured. The difference ($\Delta$x1) between the actual position of the second vertical line and the ideal position of the vertical line can be calculated by $\Delta x1 = x1 - \alpha$. The difference ($\Delta$x2) between the actual position of the third vertical line and the ideal position of the vertical line can be calculated by $\Delta x2 = x2 - 2\alpha$. The difference ($\Delta$x3) between the actual position of the third vertical line and the ideal position of the vertical line can be calculated by $\Delta x3 = x3 - 3\alpha$. The difference ($\Delta$x1, $\Delta$x2, and $\Delta$x3) represents the relative positional deviation of the print head 6 located upstream in the main-scanning direction. Therefore, if the positional deviation in the main-scanning direction of the print head 6 located upstream is corrected based on the difference ($\Delta$x1, $\Delta$x2, and $\Delta$x3), the positions of the vertical lines (solid lines) actually recorded on the recording medium 16 coincide with the ideal positions of the vertical lines (dotted lines).

To measure the relative positional deviation in the main-scanning direction of the print head 6 located downstream, the method described above and illustrated in FIG. 15 is used. However, as illustrated in FIG. 16, the position of the first black vertical line formed on the leftmost side may be shifted with respect to the position of the reference line for measuring positional deviation in the main-scanning direction. Therefore, the difference ($\Delta$x0) between the position of the first black vertical line recorded on the leftmost side and the position of the reference line for measuring positional deviation in the main-scanning direction is calculated. With the difference ($\Delta$x0), the position of the first black vertical line formed on the leftmost side is then corrected to the position of the reference line for measuring positional deviation in the main-scanning direction (ideal position). Subsequently, the method illustrated in FIG. 15 is used to measure the relative positional deviation in the main-scanning direction of the print head 6 located downstream to correct the positional deviation in the main-scanning direction.

To measure the deviation in the sub-scanning direction between the print head 6 located upstream and the print head 6 located downstream, four horizontal lines arranged in the middle in FIG. 14 are used. Among the four horizontal lines, two horizontal lines on the lower side are formed on the recording medium 16 by using the print head 6 located upstream, and two horizontal lines on the upper side are formed on the recording medium 16 by using the print head 6 located downstream. As illustrated in FIG. 17, the distances ($\beta$1 and $\beta$2) between the respective horizontal lines, and the difference therebetween ($\Delta\beta = \beta 1 - \beta 2$) is calculated as the amount of positional deviation in the sub-scanning direction between the print head 6 located upstream and the print head 6 located downstream. If the positional deviation in the sub-scanning direction between the print head 6 located upstream and the print head 6 located downstream is corrected based on the difference ($\Delta\beta$), the distances ($\beta$1 and $\beta$2) between the respective horizontal lines become equal to each other.

Since the sub-scanning distance reference line and the main-scanning distance reference line by the distance measurement line 405 of the reference chart unit 400 are absolute distances, the absolute distances of the sub-scanning distance reference line and the main-scanning distance reference line are measured in advance and stored, the distances of the sub-scanning distance reference line and the main-scanning distance reference line on the image, which is illustrated in FIG. 14 and obtained by capturing the reference chart unit 400, are compared with the stored absolute distances of the sub-scanning distance reference line and the main-scanning distance reference line, the relative ratios between the distances on the image and the absolute distances are calculated, and the amount of positional deviation obtained from the test pattern 110 in the above subject image-capturing area is multiplied by the relative ratios, thereby calculating the actual amount of positional deviation. By correcting the positional deviation based on this actual amount of positional deviation, it is possible to correct the positional deviation with high accuracy.

The method for measuring positional deviation described above is a method for measuring the positional deviation in the image by using the test pattern 110 of a line pattern illustrated in FIG. 14. However, the method for measuring the positional deviation in the image is not limited to the method described above, and various types of methods can be applied thereto. For example, geometric positional deviation between the print heads 6 can be measured by using the test pattern 120 of a dot pattern illustrated in FIG. 18.

In the case of the test pattern 120 illustrated in FIG. 18, the amount of positional deviation in the main-scanning and sub-scanning directions of the print head 6 located upstream can be measured using dots in a first frame 301. Also, the amount of positional deviation in the main-scanning and sub-scanning directions of the print head 6 located downstream can be measured using dots in a second frame 302. Furthermore, the amount of positional deviation in the main-scanning and sub-scanning directions between the print head 6 located upstream and the print head 6 located downstream can be measured using dots in a third frame 303. Moreover, the amount of positional deviation in the main-scanning and sub-scanning directions of the print head 6 caused by the reciprocation of the carriage 5 can be measured using dots in a fourth frame 304.

Method for Measuring Dot Diameter in Image

Figure 19:
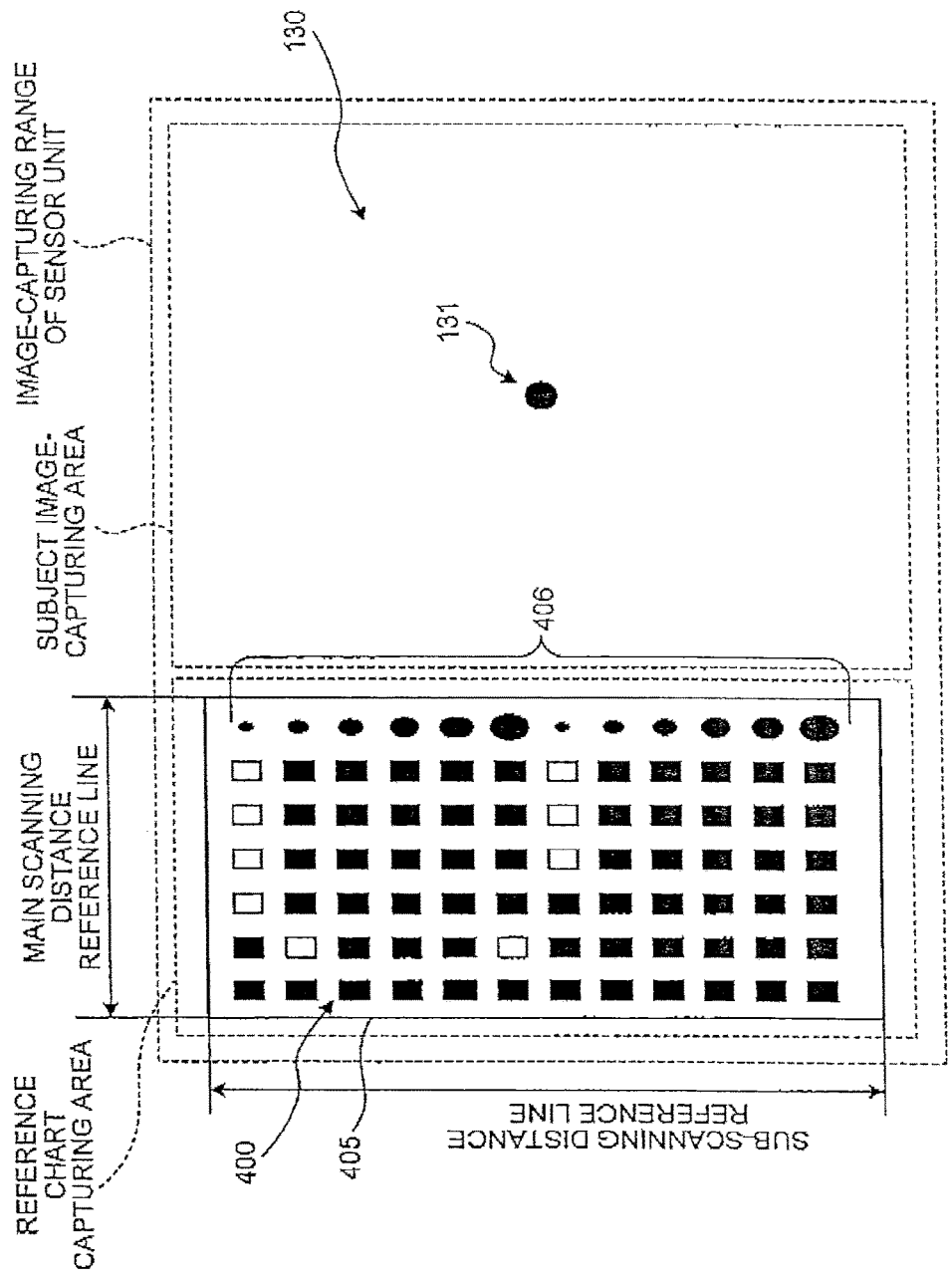
FIG. 19 is a view illustrating an example of image data acquired by capturing a test pattern for measuring dot diameter and the reference chart unit in the sensor unit at the same time.
Figure 20:
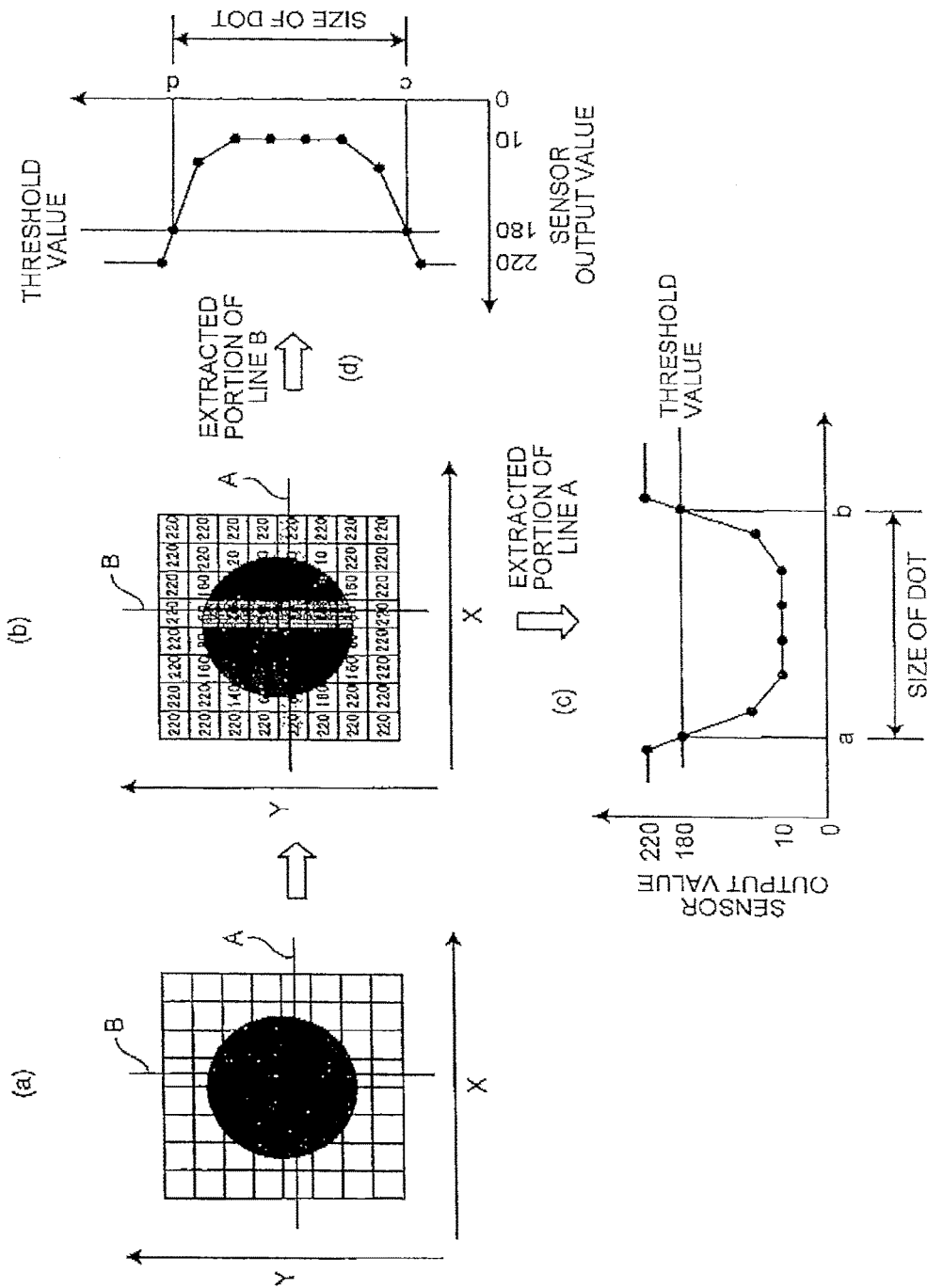
FIG. 20 is a view explaining a method of measuring a dot diameter from image data on the vicinity of the dot included in the test pattern.

Next a specific example of the method for measuring dot diameter in an image using the color measuring device will be described in detail with reference to FIG. 19 and FIG. 20. FIG. 19 is a view illustrating an example of image data acquired by capturing a test pattern 130, which is an image for measuring dot diameter, and the reference chart unit 400 in the sensor unit 430 at the same time. FIG. 20 is a view explaining a method of measuring a dot diameter from image data on the vicinity of the dot included in the test pattern 130.

To measure the dot diameter in the image, first, the image forming apparatus 100 forms the predefined test pattern 130, which is an image for measuring dot diameter, on the recording medium 16. The test pattern 130 includes at least one dot 131. Subsequently, the sensor unit 430 included in the image capturing unit 42 of the color measuring device captures the test pattern 130 formed on the recording medium 16 and the reference chart unit 400 at the same time.

As a result, the image data including the test pattern 130 and the reference chart unit 400 as illustrated in FIG. 19 is acquired, for example.

After the image data of the test pattern 130 and the reference chart unit 400 captured by the sensor unit 430 is processed by the image processing unit 45, the image data is transmitted from the image capturing unit 42 to the color measurement control unit 50 via the interface unit 46 and stored in the frame memory 51 of the color measurement control unit 50. The dot diameter calculating unit 533 of the arithmetic unit 53 then reads the image data stored in the frame memory 51 and measures dot diameter in the image.

The dot diameter calculating unit 533 first specifies, by pattern matching, and the like, the positions of the chart position specification markers 407 arranged at four corners of the distance measurement line (main-scanning and sub-scanning distance reference lines) 405 of the reference chart unit 400 from the image data read from the frame memory 51. The position of the reference chart unit 400 in the image data then can be specified. After specifying the position of the reference chart unit 400, the position of the dot diameter measurement pattern forming the pattern array 406 is specified.

The dot diameter calculating unit 533 compares the dot 131 included in the test pattern 130 and each dot diameter measurement pattern forming the pattern array 406 of the reference chart unit 400 by performing processing on the image data, specifies a dot diameter measurement pattern having the same size as the dot 131 included in the test pattern 130 among the dot diameter measurement patterns forming the pattern array 406, and calculates a dot diameter, which is the size of the dot 131 output from the image forming apparatus 100 to the recording medium 16.

FIG. 20 is a view explaining a method of measuring a dot diameter from image data on the vicinity of the dot included in the test pattern. A diagram (a) in FIG. 20 illustrates a pixel in the vicinity of the dot 131 included in the test pattern 130, and a diagram (b) in FIG. 20 illustrates a value of the pixel in the vicinity of the dot 131. For example, a graph (c) of sensor output values illustrated in FIG. 20 can be obtained by extracting a row of line A in an X-axis direction illustrated in the diagram (a) in FIG. 20, and connecting values of pixels forming the row of line A with a straight line. Using a predefined threshold value, two intersecting points a and b can be obtained when detecting the sensor output values that exceed the threshold value. The size of the dot 131 in the line A can be specified by calculating a distance between the two points a and b. Since in which region of the subject image-capturing area the dot 131 is detected is not known, the process of specifying the size of the dot 131 in the X-axis direction is performed entirely in the Y-axis direction. The largest distance between two points among the distances between two points obtained by the processing described above is the size of the dot 131 in the X-axis direction.

Similarly, a graph (c) of sensor output values illustrated in FIG. 20 can be obtained by extracting a row of line B in the Y-axis direction illustrated in the diagram (a) in FIG. 20, and connecting values of pixels forming the row of line B with a straight line. Using the predefined threshold value similar to the above, two intersecting points c and d can be obtained when detecting the sensor output values that exceed the threshold value. The size of the dot 131 in the line B can be specified by calculating a distance between the two points c and d. Since in which region of the subject image-capturing area the dot 131 is detected is not known, the process of specifying the size of the dot 131 in the Y-axis direction is performed entirely in the X-axis direction. The largest distance between two points among the distances between two points obtained by the processing described above is the size of the dot 131 in the Y-axis direction.

Accordingly, the size in the X-axis direction and the size in the Y-axis direction of the dot 131 included in the test pattern 130 can be specified, and the relative size of the dot 131 in the image captured in the sensor unit 430 can be specified. In the example illustrated in FIG. 20, the threshold value with respect to the sensor output values is set to 180, but this value is merely an example and may adopt a threshold value suited for accurately extracting an edge portion of the dot 131.

The size of the dot 131 obtained by the processing described above is the relative size of the dot 131 in the image captured in the sensor unit 430. In order to convert this relative size of the dot 131 to a dot diameter, which is an absolute size of the dot 131 output from the image forming apparatus 100 to the recording medium 16, the dot diameter measurement pattern array 406 included in the reference chart unit 400 captured at the same time as the test pattern 130. In other words, among the dot diameter measurement patterns configuring the dot diameter measurement pattern array 406, the dot diameter measurement pattern having a size closest to the relative size of the dot 131 obtained by the above-described processing is specified. The dot diameter corresponding to each dot diameter measurement pattern configuring the dot diameter measurement pattern array 406 is measured in advance and stored. Therefore, the dot diameter, which is the absolute size of the dot 131 output from the image forming apparatus 100 to the recording medium 16, can be calculated by specifying the dot diameter measurement pattern having a size closest to the relative size of the dot 131 obtained by the above-described processing.

Modification of Image Capturing Unit

Next, a modification of the image capturing unit 42 will be explained. In the following, the image capturing unit 42 of a first modification is expressed as the image capturing unit 42A, the image capturing unit 42 of a second modification is expressed as an image capturing unit 42B, the image capturing unit 42 of a third modification is expressed as an image capturing unit 42C, the image capturing unit 42 of a fourth modification is expressed as an image capturing unit 42D, the image capturing unit 42 of a fifth modification is expressed as an image capturing unit 42E, and the image capturing unit 42 of a sixth modification is expressed as an image capturing unit 42F. In each modification, the same reference numerals are assigned to components common to the above image capturing units 42, and an overlapping explanation thereof will be omitted.

First Modification

Figure 21:
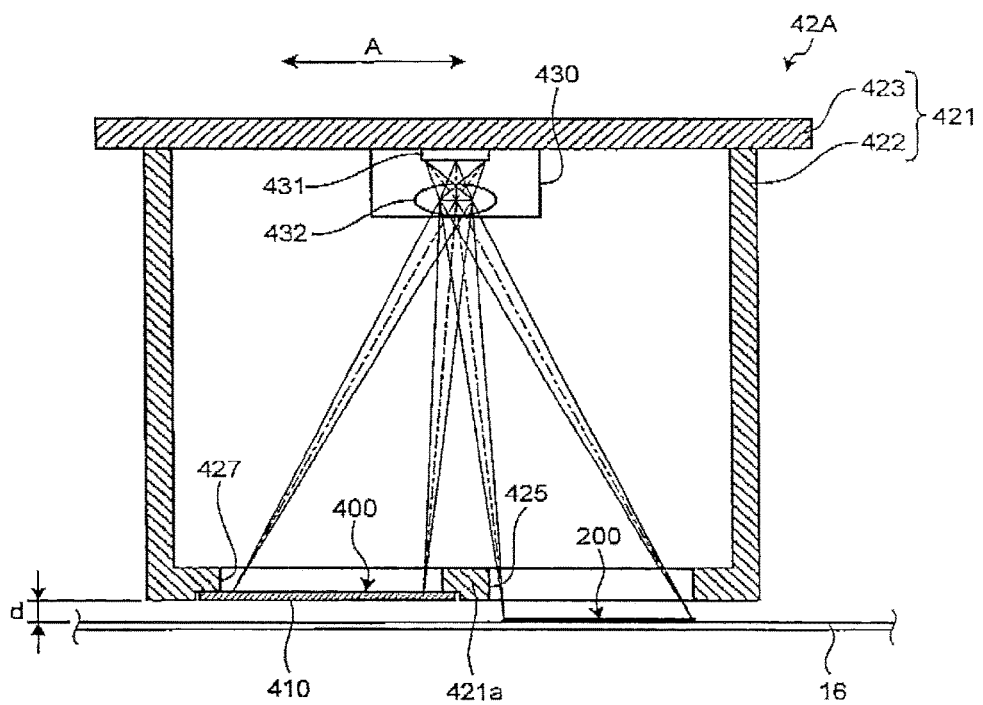
FIG. 21 is a vertical cross-sectional view of an image capturing unit according to a first modification.

FIG. 21 is a vertical cross-sectional view of an image capturing unit 42A according to the first modification, which is a cross-sectional view in the same position as in the vertical cross-sectional view of the image capturing unit 42 illustrated in FIG. 4A.

In the image capturing unit 42A according to the first modification, an opening 427 different from the opening 425 to capture the patch image 200 is provided in the bottom surface 421a of the housing 421. Also, the chart plate 410 is arranged so as to close this opening 427 from the outside of the housing 421. That is, in the above-described image capturing unit 42, the chart plate 410 is arranged on the internal surface side facing the sensor unit 430 of the bottom surface 421a of the housing 421, while, in the image capturing unit 42A according to the first modification, the chart plate 410 is arranged on the external surface side facing the recording medium 16 of the bottom surface 421a of the housing 421.

To be more specific, for example, a concave portion having a depth corresponding to the thickness of the chart plate 410 is formed on the external surface side of the bottom surface 421a of the housing 421 so as to be communicated with the opening 427. In this concave portion, the chart plate 410 is arranged such that a surface on which the reference chart unit 400 is formed faces the side of the sensor unit 430. For example, an end part of the chart plate 410 is connected to the bottom surface 421a of the housing 421 by an adhesion bond or the like in the vicinity of an edge of the opening 427, and the chart plate 410 is integrated with the housing 421.

In the image capturing unit 42A according to the first modification configured as above, by arranging the chart plate 410, on which the reference chart unit 400 is formed, on the external surface side of the bottom surface 421a of the housing 421, compared to the above image capturing unit 42, it is possible to reduce a difference between a light path length from the sensor unit 430 to the patch image 200 and a light path length from the sensor unit 430 to the reference chart unit 400. Therefore, even if the depth of field of the sensor unit 430 is relatively shallow, it is possible to capture an image focusing on both the patch image 200 and the reference chart unit 400.

Second Modification

Figure 22:
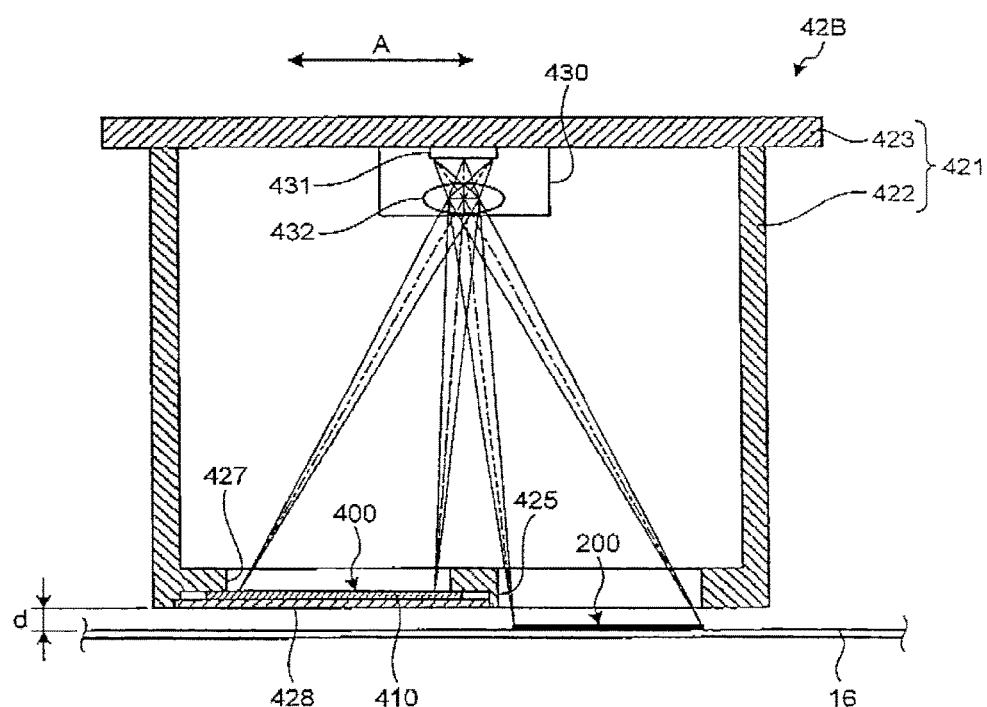
FIG. 22 is a vertical cross-sectional view of an image capturing unit according to a second modification.

FIG. 22 is a vertical cross-sectional view of an image capturing unit 42B according to the second modification, which is a cross-sectional view in the same position as in the vertical cross-sectional view of the image capturing unit 42 illustrated in FIG. 4A.

In the image capturing unit 42B according to the second modification, similar to the image capturing unit 42A according to the first modification, the chart plate 410 is arranged on the external surface side of the bottom surface 421a of the housing 421. However, in the image capturing unit 42A according to the first modification, the chart plate 410 is connected to the bottom surface 421a of the housing 421 by an adhesion bond or the like and integrated with the housing 421, while, in the image capturing unit 42B according to the second modification, the chart plate 410 is held so as to be detachable to the housing 421.

To be more specific, for example, similar to the image capturing unit 42A according to the first modification, a concave portion communicated with the opening 427 is formed on the external surface side of the bottom surface 421a of the housing 421 and the chart plate 410 is arranged in this concave portion. Also, the image capturing unit 42B according to the second modification has a holding member 428 to press and hold the chart plate 410 arranged in the concave portion from the external surface side of the bottom surface 421a of the housing 421. The holding member 428 is detachably attached to the bottom surface 421a of the housing 421. Therefore, in the image capturing unit 42B according to the second modification, by detaching the holding member 428 from the bottom surface 421a of the housing 421, it is possible to easily extract the chart plate 410.

As described above, in the image capturing unit 42B according to the second modification, since the chart plate 410 is detachably held with respect to the housing 421 and the chart plate 410 can be easily extracted, in a case where the chart plate 410 degrades due to dirt of the reference chart unit 400 or the like, it is possible to easily perform an operation of exchanging the chart plate 410. Also, when the above shading correction unit 452 acquires shading data to correct illuminance unevenness in the illumination light source 426, by extracting the chart plate 410, arranging a white reference plate instead and capturing this white reference plate by the sensor unit 430, it is possible to easily acquire the shading data.

Third Modification

Figure 23:
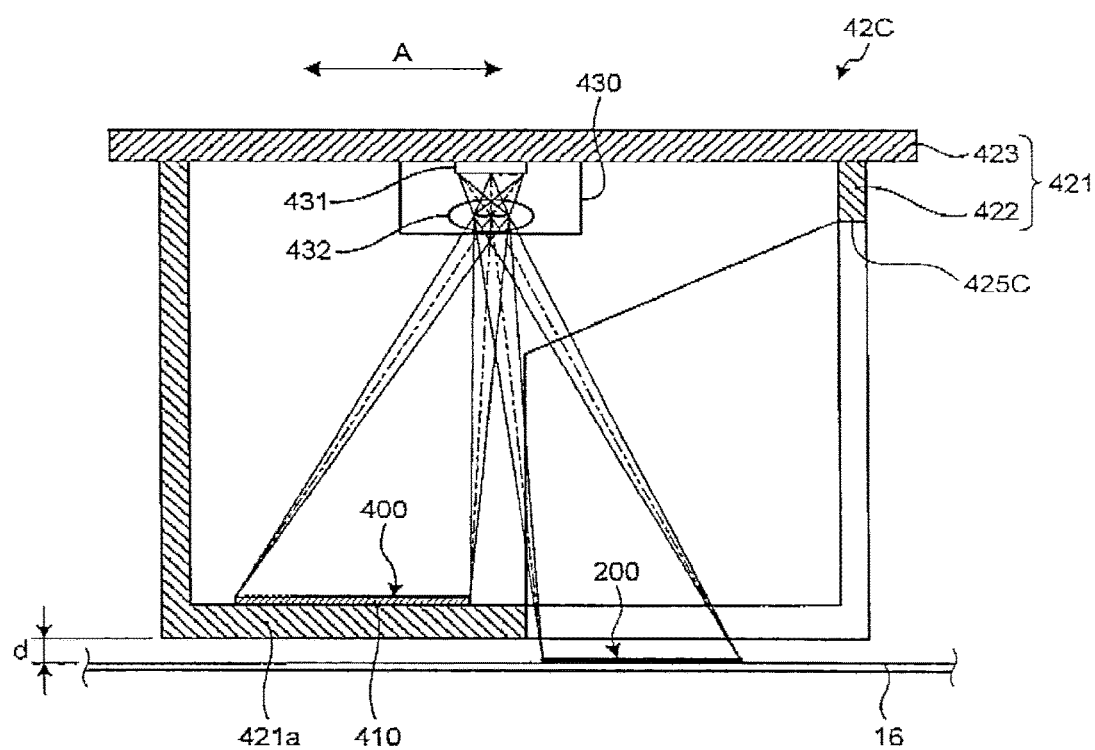
FIG. 23 is a vertical cross-sectional view of an image capturing unit according to a third modification.

FIG. 23 is a vertical cross-sectional view of an image capturing unit 42C according to the third modification, which is a cross-sectional view in the same position as in the vertical cross-sectional view of the image capturing unit 42 illustrated in FIG. 4A.

In the image capturing unit 42C according to the third modification, an opening 425C that opens greatly from the bottom surface 421a to the side wall is formed in the housing 421, and the image of the patch image 200 is captured through such opening 425C. In other words, in the image capturing unit 42 described above, the opening 425 for capturing the patch image 200 is formed to open only at the bottom surface 421a of the housing 421 so as to shield the outside light directed towards the patch image 200 of the color measurement target and have the patch image 200 illuminated with only the illumination light from the illumination light source 426. The image capturing unit 42C according to the third modification, on the other hand, has the opening 425C opened greatly from the bottom surface 421a to the side wall of the housing 421 is formed based on the assumption that it is arranged in an environment where outside light does not enter.

For example, as illustrated in FIG. 1, the inside of the exterior body 1 in a state the cover member 2 is closed is an environment where the outside light does not enter. Since the image capturing unit 42C is mounted on the carriage 5 arranged inside the exterior body 1, the image capturing unit 42C can be arranged in an environment where the outside light does not enter. Therefore, even with the configuration in which the opening 425C opened greatly from the side bottom surface 421a to the side wall of the housing 421 is formed, the patch image 200 can be illuminated with only the illumination light from the illumination light source 426.

Therefore, the image capturing unit 42C according to the third modification can reduce the weight of the housing 421 and reduce the power consumption since the opening 425C opened greatly from the bottom surface 421a to the side wall is formed.

Fourth Modification

Figure 24A:
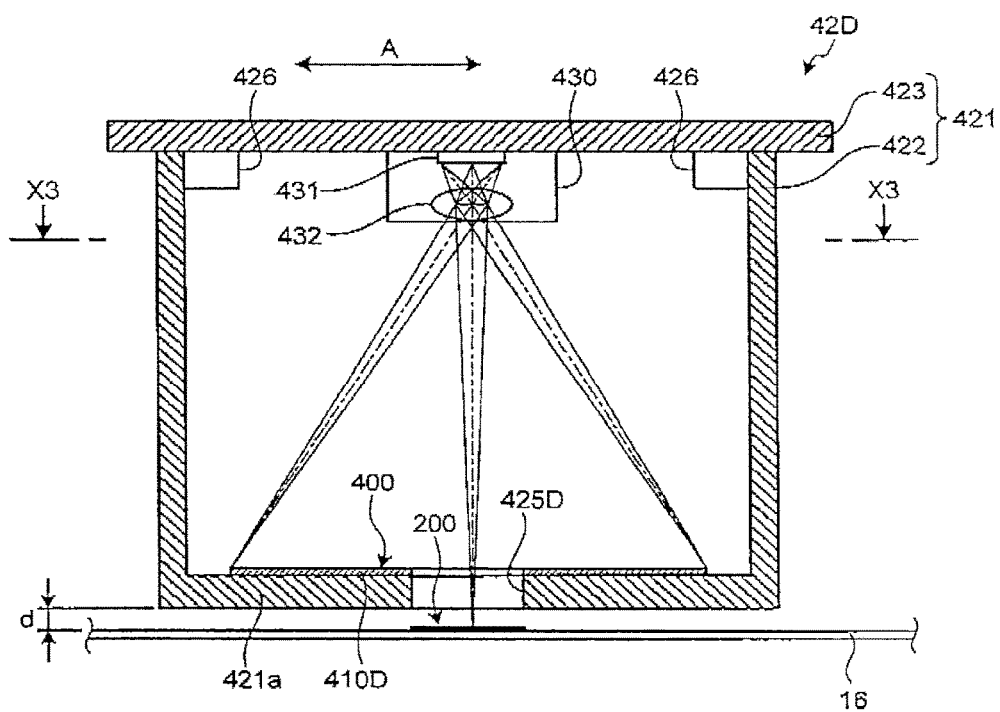
FIG. 24A is a vertical cross-sectional view of an image capturing unit according to a fourth modification.
Figure 24B:
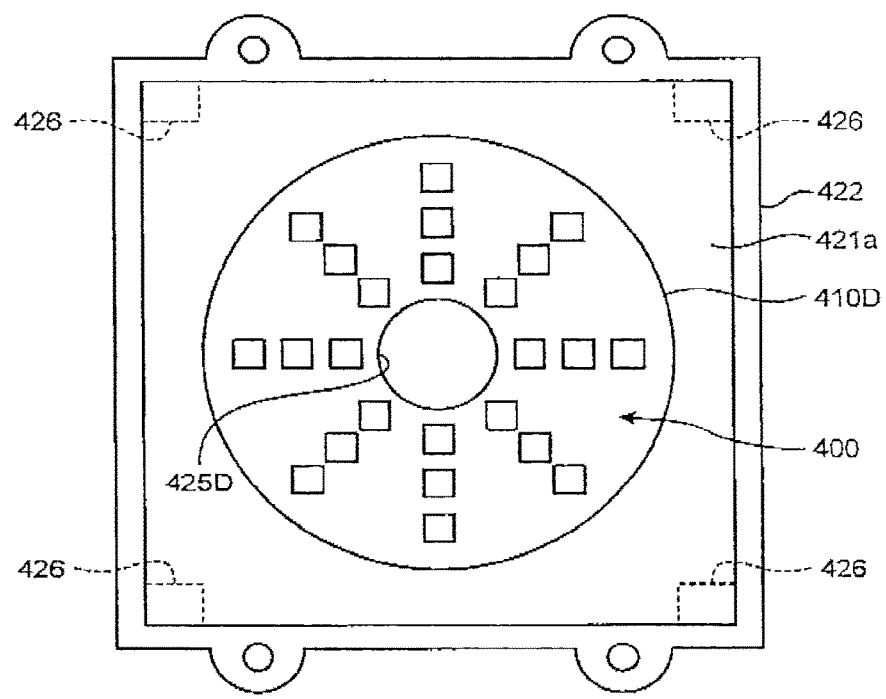
FIG. 24B is a plan view of a bottom surface of a housing in the image capturing unit according to the fourth modification, seen in the X3 direction in FIG. 24A.

FIG. 24A is a vertical cross-sectional view of an image capturing unit 42D according to the fourth modification, which is a cross-sectional view in the same position as in the vertical cross-sectional view of the image capturing unit 42 illustrated in FIG. 4A. FIG. 24B is a plan view of the bottom surface 421a of the housing 421 seen from an X3 direction in FIG. 24A. In FIG. 24B, a vertical projection position of the illumination light source 426 in the bottom surface 421a of the housing 421 (i.e., projected position when the bottom surface 421a is vertically looked down) is represented with a dash line.

In the image capturing unit 42D according to the fourth modification, in the bottom surface 421a of the housing 421, an opening 425D is provided in a position (i.e. light axis center of the sensor unit 430) on a perpendicular line drawn from the sensor unit 430 to the bottom surface 421a to capture the subject (i.e. patch image 200) via this opening 425D. That is, in the image capturing unit 42D according to the fourth modification, the opening 425D to capture the subject (i.e. patch image 200) outside the housing 421 is provided so as to be positioned in substantially the center in the image-capturing range of the sensor unit 430.

Also, in the image capturing unit 42D according to the fourth modification, a chart plate 410D on which the reference chart unit 400 is formed is arranged in the bottom surface 421a of the housing 421 so as to surround the periphery of the opening 425D. For example, the chart plate 410D is formed in an annular shape with respect to the opening 425D, bonded to the internal surface side of the bottom surface 421a of the housing 421 by an adhesive material, using as a bonding plane a surface opposite to the surface on which the reference chart unit 400 is formed, and held in a state where it is fixed to the housing 421.

Also, in the image capturing unit 42D according to the fourth modification, as the illumination light source 426, four LEDs arranged at four corners on the inner periphery side of the frame body 422 forming the side walls of the housing 421 are used. For example, these four LEDs used as the illumination light source 426 are mounted on the internal surface of the board 423 together with the two-dimensional image sensor 431 of the sensor unit 430. By arranging the four LEDs used as the illumination light source 426 as above, it is possible to illuminate the subject (i.e. patch image 200) and the reference chart unit 400 in substantially the same conditions.

In the image capturing unit 42D according to the fourth modification configured as above, the opening 425D to capture the subject (i.e. patch image 200) outside the housing 421 is set on a perpendicular line drawn from the sensor unit 430 in the bottom surface 421a of the housing 421, the chart plate 410D on which the reference chart unit 400 is formed is arranged so as to surround the periphery of the opening 425D, and therefore it is possible to adequately capture the subject (i.e. patch image 200) and the reference chart unit 400.

Fifth Modification

Figure 25:
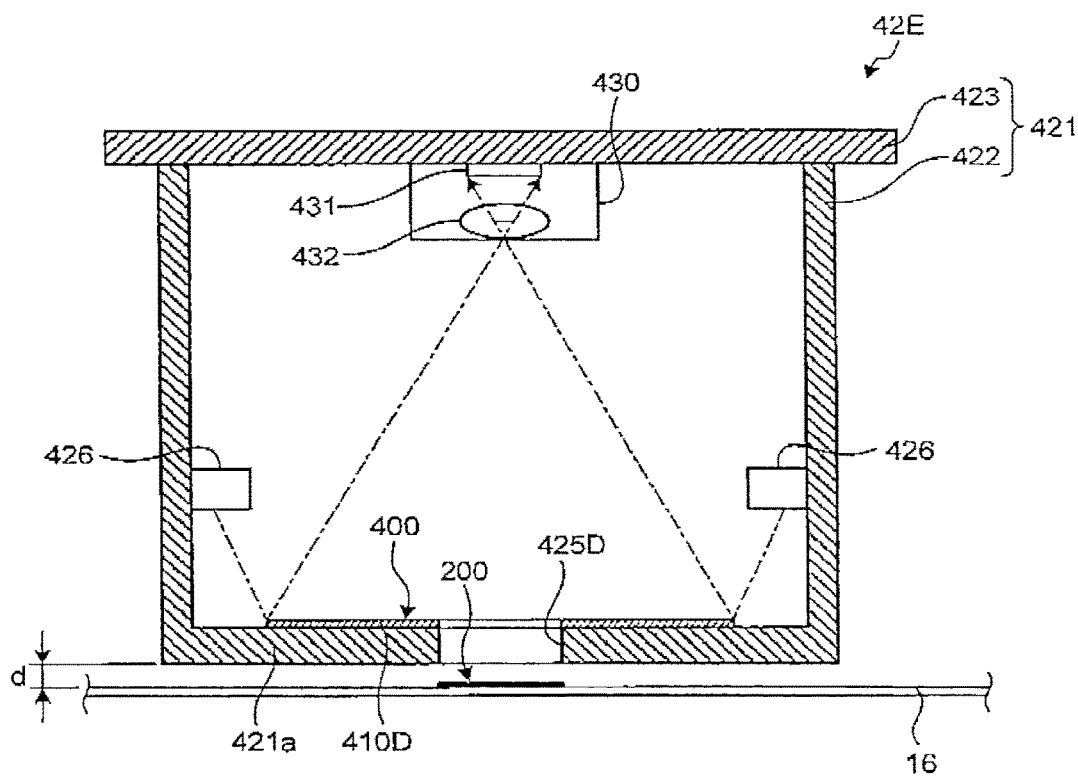
FIG. 25 is a vertical cross-sectional view of an image capturing unit according to a fifth modification.

FIG. 25 is a vertical cross-sectional view of an image capturing unit 42E according to the fifth modification, which is a cross-sectional view in the same position as in the vertical cross-sectional view of the image capturing unit 42 illustrated in FIG. 4A.

In the image capturing unit 42E according to the fifth modification, similar to the image capturing unit 42D according to the fourth modification, four LEDs arranged at four corners on the inner periphery side of the frame body 422 are used as the illumination light source 426. However, in the image capturing unit 42E according to the fifth modification, the four LEDs used as the illumination light source 426 are arranged in positions closer to the bottom surface 421a of the housing 421 compared to the image capturing unit 42D according to the fourth modification, such that regular reflection light regular-reflected by the subject (i.e. patch image 200) or the reference chart unit 400 does not enter the two-dimensional image sensor 431 of the sensor unit 430.

In the sensor surface of the two-dimensional image sensor 431 of the sensor unit 430, since a pixel value is saturated in a position at which the regular reflection light of the illumination light source 426 enters, there is a case where it is not possible to acquire accurate information. Therefore, when the illumination light source 426 is arranged in a position at which the regular reflection light regular-reflected by the subject (i.e. patch image 200) or the reference chart unit 400 enters the two-dimensional image sensor 431 of the sensor unit 430, it is concerned that it is not possible to acquire information required for color measurement of the subject (i.e. patch image 200). Therefore, in the image capturing unit 42E according to the fifth modification, as illustrated in FIG. 25, the four LEDs used as the illumination light source 426 are arranged in positions closer to the bottom surface 421a of the housing 421, such that the regular reflection light regular-reflected by the subject (i.e. patch image 200) or the reference chart unit 400 does not enter the two-dimensional image sensor 431 of the sensor unit 430. Here, chain-line arrows in FIG. 25 represent an image of light paths of regular reflection light.

As described above, in the image capturing unit 42E according to the fifth modification, since the illumination light source 426 is arranged in a position at which regular reflection light regular-reflected by the subject (i.e. patch image 200) or the reference chart unit 400 does not enter the two-dimensional image sensor 431 of the sensor unit 430, it is possible to efficiently suppress that a pixel value is saturated in a position in which an optical image of the subject (i.e. patch image 200) or the reference chart unit 400 forms an image in the sensor surface of the two-dimensional image sensor 431, and it is possible to adequately capture the subject (i.e. patch image 200) and the reference chart unit 400 since the chart plate 410D on which the reference chart unit 400 is formed is arranged.

In the image capturing unit 42E according to the fifth modification, an example of the configuration including the opening 425D and the chart plate 410D similar to the image capturing unit 42D according to the fourth modification is described, where the illumination light source 426 is arranged at the position at which the regular reflection light regular-reflected by the subject (i.e., patch image 200) or the reference chart unit 400 does not enter the two-dimensional image sensor 431 of the sensor unit 430. However, in the configuration of the image capturing unit 42, the image capturing unit 42A according to the first modification, the image capturing unit 42B according to the second modification, and the image capturing unit 42C according to the third modification described above, the illumination light source 426 may be arranged at the position at which the regular reflection light regular-reflected by the subject (i.e., patch image 200) or the reference chart unit 400 does not enter the two-dimensional image sensor 431 of the sensor unit 430. In this case as well, effects similar to the image capturing unit 42E according to the fifth modification are obtained.

Sixth Modification

Figure 26:
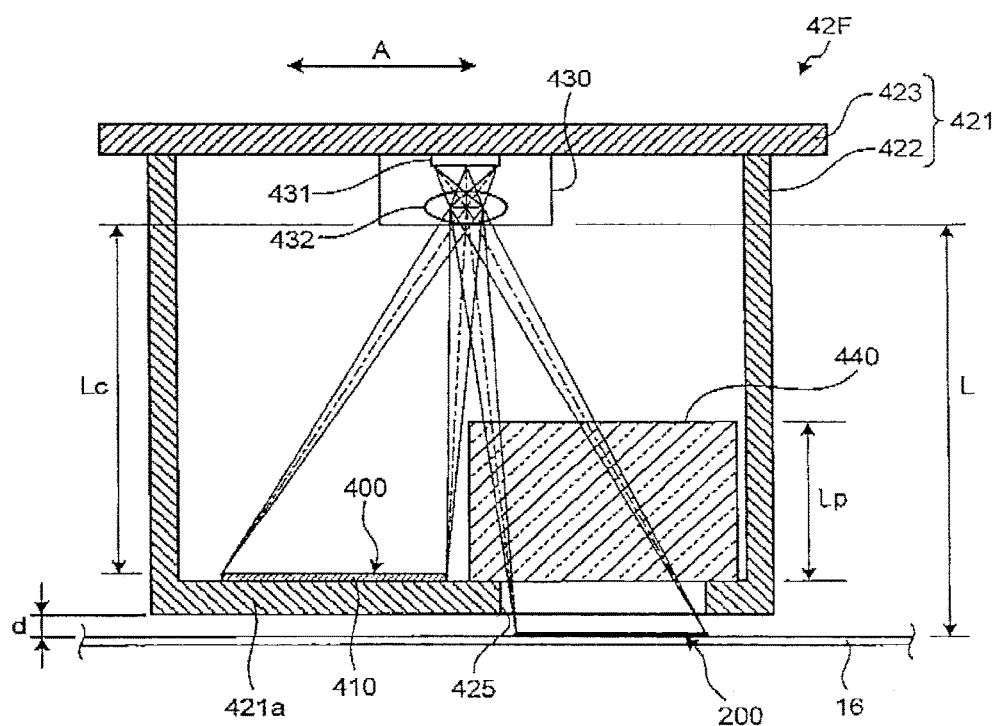
FIG. 26 is a vertical cross-sectional view of an image capturing unit according to a sixth modification.

FIG. 26 is a vertical cross-sectional view of an image capturing unit 42F according to the sixth modification, which is a cross-sectional view in the same position as in the vertical cross-sectional view of the image capturing unit 42 illustrated in FIG. 4A.

In the image capturing unit 42F according to the sixth modification, a light path length change member 440 is arranged inside the housing 421. The light path length change member 440 is an optical element that has a refractive index "n" (where "n" is an arbitrary number) and transmits light. The light path length change member 440 is arranged on a light path between the subject (i.e. patch image 200) outside the housing 421 and the sensor unit 430, and has a function of causing an imaging surface of an optical image of the subject (i.e. patch image 200) to approach an imaging surface of an optical image of the reference chart unit 400. That is, in the image capturing unit 42F according to the sixth modification, by arranging the light path length change member 440 on the light path between the subject (i.e. patch image 200) and the sensor unit 430, the imaging surface of the optical image of the subject (i.e. patch image 200) outside the housing 421 and the imaging surface of the reference chart unit 400 inside the housing 421 are both fitted to the sensor surface of the two-dimensional image sensor 431 of the sensor unit 430. Although an example where the light path length change member 440 is placed on the bottom surface 421a of the housing 421 is illustrated in FIG. 26, the light path length change member 440 does not have to be necessarily placed on the bottom surface 421a, and an essential requirement is that the light path length change member 440 is placed on a light path between the subject (i.e. patch image 200) outside the housing 421 and the sensor unit 430.

When light passes through the light path length change member 440, the light path length extends according to the refractive index "n" of the light path length change member 440 and an image is seen as if it floats. An image float amount C can be calculated in the following equation, with the presumption that a length in the optical axis direction of the light path length change member 440 is "Lp".

$$C=Lp(1-1/n)$$

Also, when a distance between the principal point of the imaging lens 432 of the sensor unit 430 and the reference chart unit 400 is Lc, a distance L between the principal point of the imaging lens 432 and a front-side focal plane (i.e. imaging area) of an optical image going through the light path length change member 440, can be calculated by the following equation.

$$L=Lc+Lp(1-1/n)$$

Here, when the refractive index "n" of the light path length change member 440 is 1.5, equation L=Lc+Lp(⅓) is used to calculate, and it is possible to lengthen a light path length of the optical image going through the light path length change member 440, by one-third of a length Lp in the optical axis direction of the light path length change member 440. In this case, for example, when Lp=9 [mm] is presumed, since L=Lc+3 [mm] is established, by capturing an image in a state where a difference between the distance from the sensor unit 430 to the reference chart unit 400 and the distance from the sensor unit 430 to the subject (i.e. patch image 200) is 3 mm, it is possible to fit the rear-side focal plane (i.e. imaging surface) of the optical image of the reference chart unit 400 and the rear-side focal plane (i.e. imaging surface) of the optical image of the subject (i.e. patch image 200) to the sensor surface of the two-dimensional image sensor 431 of the sensor unit 430.

In the image capturing unit 42F according to the sixth modification configured as above, by arranging the light path length change member 440 in the light path between the subject (i.e., patch image 200) and the sensor unit 430, the imaging surface of the optical image of the subject (i.e. patch image 200) is made to approach the imaging surface of optical image of the reference chart unit 400 so that it is possible to capture an image focusing on both the subject (i.e. patch image 200) and the reference chart unit 400.

Modifications of Color Measurement Method for Patch Image

Next, with reference to FIGS. 27 to 33, modifications of the color measurement method for the patch image 200 by the image forming apparatus 100 according to the present embodiment will be explained in detail. The color measurement method according to these modifications includes preprocessing implemented when the image forming apparatus 100 is in the initial state (i.e. the initial state by manufacture or overhaul) and color measurement processing implemented at the time of adjustment to perform color adjustment on the image forming apparatus 100.

Figure 27:
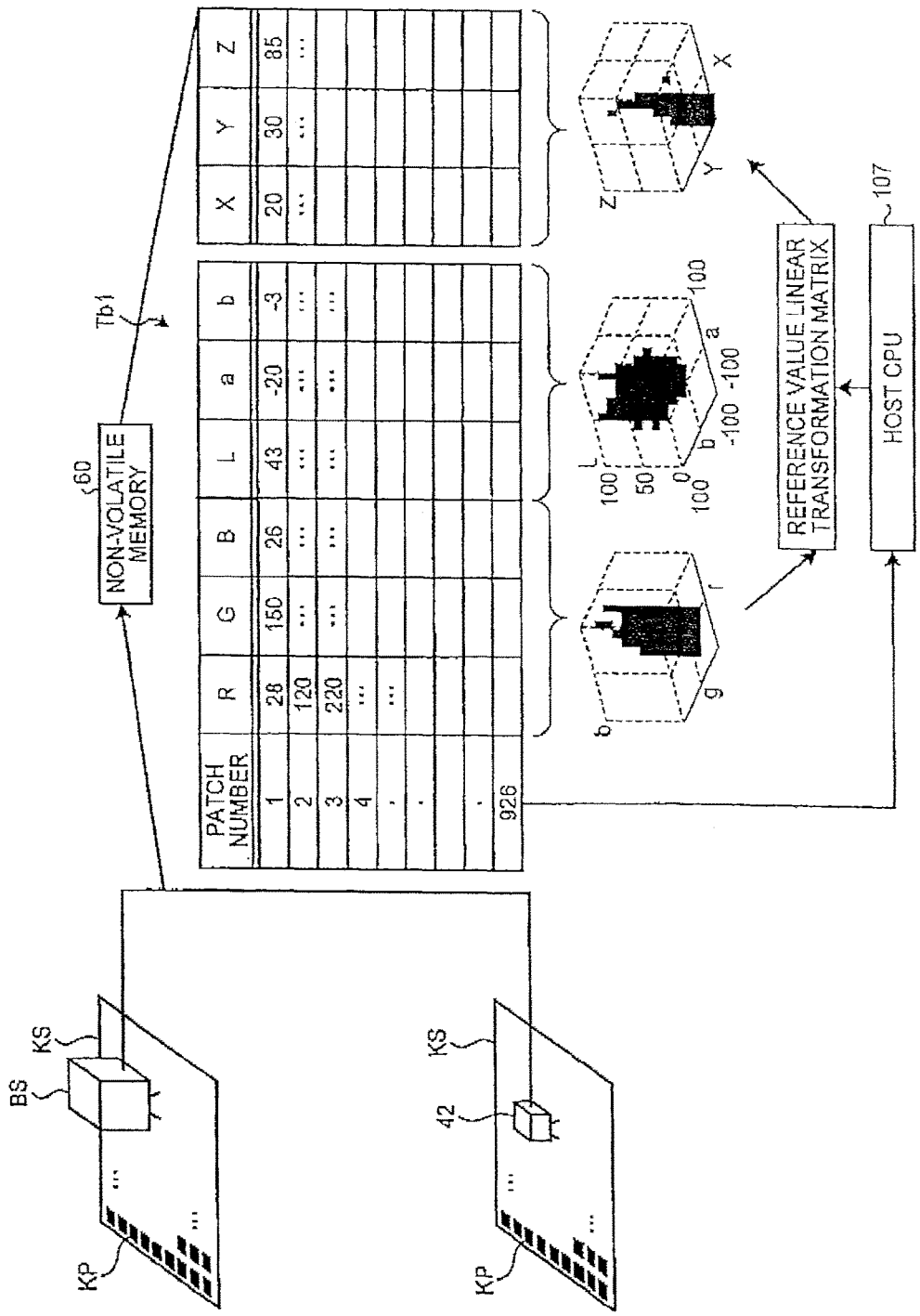
FIG. 27 is a view explaining a process of acquiring a reference color measurement value and reference RGB value and a process of generating a reference value linear transformation matrix.

FIG. 27 is a view explaining a process of acquiring a reference color measurement value and reference RGB value and a process of generating a reference value linear transformation matrix. These processes illustrated in FIG. 27 are implemented as preprocessing. The preprocessing uses a reference sheet KS on which multiple reference patches KP are arranged and formed. The reference patches KP of the reference sheet KS are equivalent to patches of the reference chart unit 400 held in the image capturing unit 42.

First, at least one of the Lab values and XYZ values as color measurement values of the multiple reference patches KP of the reference sheet KS (in the example of FIG. 32, both the Lab values and the XYZ values) is associated with each patch number and stored in a memory table Tb1 installed in a non-volatile memory 60, or the like inside the color measurement control unit 50, for example. A color measurement value of a reference patch KC is a value acquired in advance by color measurement using a spectroscope BS. If the color measurement value of the reference patch KC is known, the value thereof may be used. In the following, the color measurement value of the reference patch KC stored in the memory table Tb1 will be referred to as "reference color measurement value".

Next, the reference sheet KS is set on the platen 22; and, by controlling the movement of the carriage 5, image capturing is performed by the image capturing unit 42 using multiple reference patches KC of the reference sheet KS as subjects. The RGB value of the reference patch KC acquired by the image capturing by the image capturing unit 42 is stored in the memory table Tb1 of the non-volatile memory in association with the patch number. That is, the memory table Tb1 stores the color measurement values and RGB values of multiple reference patches KC arranged and formed on the reference sheet KS, in association with the patch number of each of the reference patches KC. In the following, the RGB value of the reference patch KC stored in the memory table Tb1 will be referred to as "reference RGB value." The reference RGB value is a value reflecting characteristics of the image capturing unit 42.

When the reference color measurement value and reference RGB value of the reference patch KC are stored in the memory table Tb1 of the non-volatile memory 60, the host CPU 107 of the image forming apparatus 100 generates a reference value linear transformation matrix that performs mutual conversion on a pair of the XYZ value as the reference color measurement value and the reference RGB value of the same patch number, and stores the reference value linear transformation matrix in the non-volatile memory 60. In a case where only the Lab value is stored in the memory table Tb1 as the reference color measurement value, after the Lab value is converted into the XYZ value using a known conversion equation for converting the Lab value into the XYZ value, the reference value linear transformation matrix may be generated.

Figures 28A, 28B:
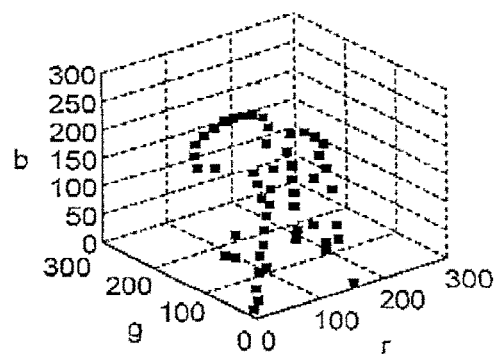
FIGS. 28A and 28B are views illustrating an example of an initial reference RGB value.
Figure 31:
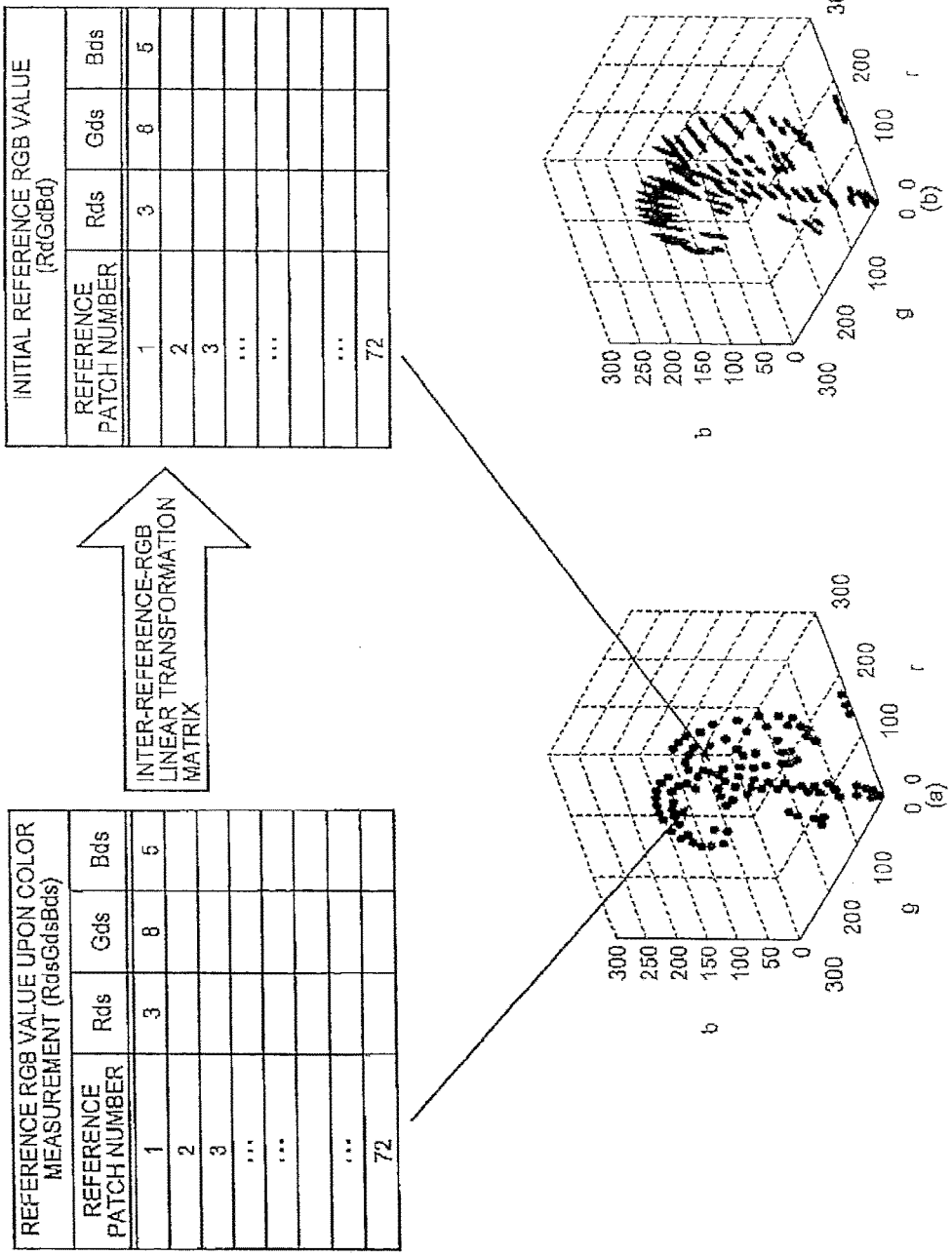
FIG. 31 is a view illustrating a relation between an initial reference RGB value and a reference RGB value upon color measurement.

Also, when the image capturing unit 42 captures the multiple reference patches KC of the reference sheet KS, the reference chart unit 400 installed in the image capturing unit 42 are captured at the same time. The RGB value of each patch of the reference chart unit 400 acquired by the image capturing are stored in the memory table Tb1 of the non-volatile memory 60 in association with the patch numbers. The RGB values of the patches of the reference chart unit 400 stored in the memory table Tb1 by this preprocessing are referred to as "initial reference RGB values". FIG. 31 is a view illustrating an example of the initial reference RGB value. FIG. 28A illustrates a state where the initial reference RGB value (RdGdBd) is stored in the memory table Tb1 and where, in addition to the initial reference RGB value (RdGdBd), an initial reference Lab value (Ldadbd) acquired by converting the initial reference RGB value (RdGdBd) into the Lab value and an initial reference XYZ value (XdYdZd) acquired by converting the initial reference RGB value (RdGdBd) into the XYZ value are stored in association. Also, FIG. 28B is a scatter diagram plotting the initial reference RGB value of each patch of the reference chart unit 400.

After the above preprocessing is finished, in the image forming apparatus 100, based on image data, print setting or the like input from the outside, the host CPU 107 performs main-scanning movement control of the carriage 5, carrier control of a recording medium P in the sheet conveying unit 112 and drive control of the print head 6 to intermittently carry the recording medium P, while controlling ink ejection from the print head 6 to output an image to the recording medium P. At this time, the ink ejection amount from the print head 6 may vary depending on device-specific characteristics and temporal changes, and, when this ink ejection amount varies, an image formation is performed with a different color from an image color intended by the user and the color reproducibility degrades. Therefore, the image forming apparatus 100 implements color measurement processing to calculate a color measurement value of the patch image 200 at predetermined timing for color adjustment. Subsequently, by performing color adjustment based on the color measurement value acquired by the color measurement processing, the color reproducibility is enhanced.

Figure 29:
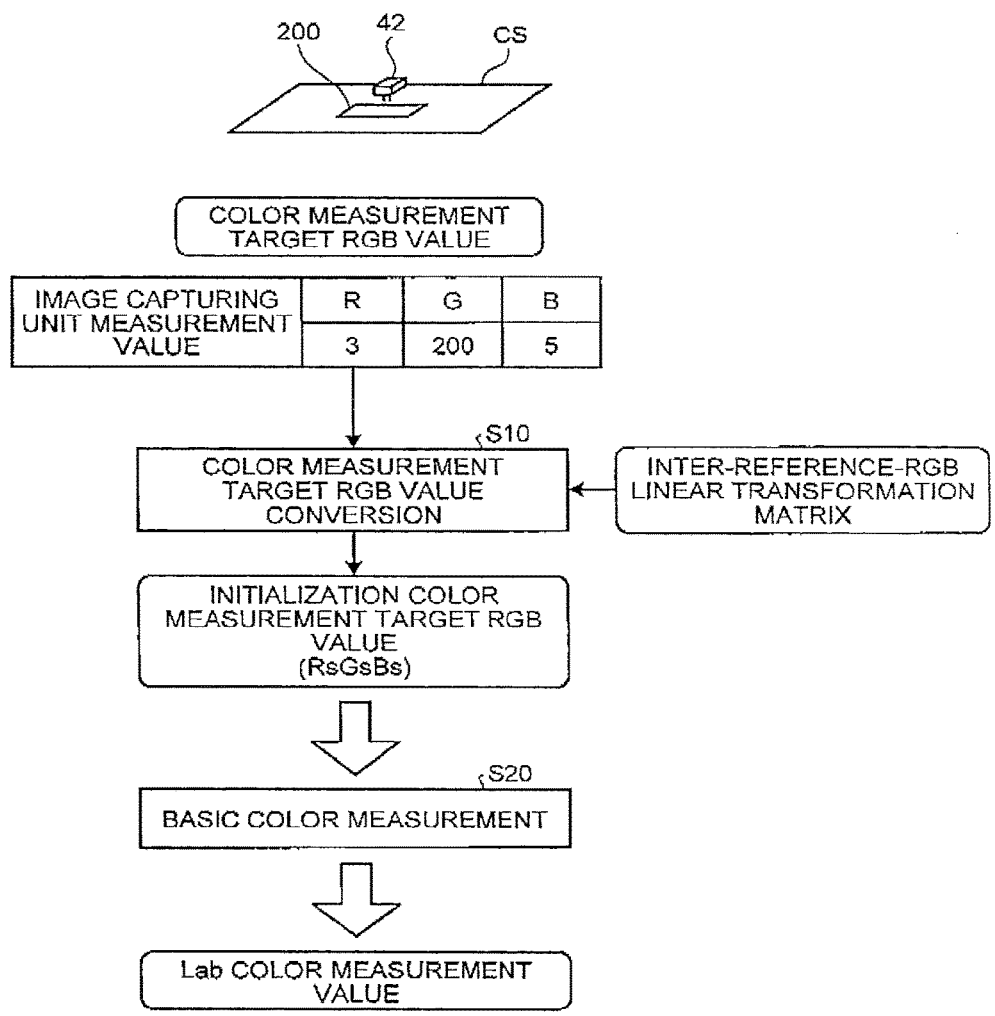
FIG. 29 is a view explaining an outline of color measurement processing.

FIG. 29 is a view explaining an outline of color measurement processing. First, at the time of performing color adjustment, the image forming apparatus 100 ejects an ink from the print head 6 onto the recording medium P set on the platen 22 and forms the patch image 200 of the color measurement target. In the following, the recording medium P on which the patch image 200 is formed will be referred to as "adjustment sheet CS". In this adjustment sheet CS, the patch image 200 is formed which reflects an output characteristic at the time of adjustment in the image forming apparatus 100, especially, an output characteristic of the print head 6. Also, image data to form the patch image 200 of the color measurement target is stored in advance in the non-volatile memory 60 or the like.

Next, as illustrated in FIG. 29, in a state where this adjustment sheet CS is set on the platen 22 or the adjustment sheet CS at the time of creation is held on the platen 22 without being ejected, the image forming apparatus 100 controls the movement of the carriage 5 and moves the image capturing unit 42 to a position facing the patch image 200 formed on the adjustment sheet CS on this platen 22. Subsequently, the image capturing unit 42 captures the patch image 200 and the reference chart unit 400 set in the image capturing unit 42 at the same time. After the image data of the patch image 200 and the reference chart unit 400 simultaneously captured by the image capturing unit 42 is subjected to essential image processing in the image processing unit 45, the image data is sent to the color measurement control unit 50 and temporarily stored in the frame memory 51. Among the image data simultaneously captured by the image capturing unit 42 and temporarily stored in the frame memory 51, the image data (i.e. RGB value) of the patch image 200 is referred to as "color measurement target RGB value", and the image data (i.e. RGB value) of the reference chart unit 400 is referred to as "reference RGB value upon color measurement (RdsGdsBds)". The "reference RGB value upon color measurement (RdsGdsBds)" is stored in the non-volatile memory 60 or the like.

The color measurement value calculating unit 531 of the color measurement control unit 50 performs processing of converting the color measurement target RGB value temporarily stored in the frame memory 51 into an initialization color measurement target RGB value (RsGsBs) using an inter-reference-RGB linear transformation matrix described below (step S10). The initialization color measurement target RGB value (RsGsBs) is acquired by removing, from the color measurement target RGB value, an influence of temporal changes in image-capturing conditions of the image capturing unit 42 caused during a time period from the time of the initial state upon performing preprocessing until the time of adjustment to perform color measurement processing, for example, an influence of temporal changes in the illumination light source 426 or temporal changes in the two-dimensional image sensor 431.

After that, the color measurement value calculating unit 531 performs basic color measurement processing (described later) on the initialization color measurement target RGB value (RsGsBs) converted from the color measurement target RGB value (step S20), thereby acquiring an Lab value as the color measurement value of the patch image 200 of the color measurement target.

Figure 30:
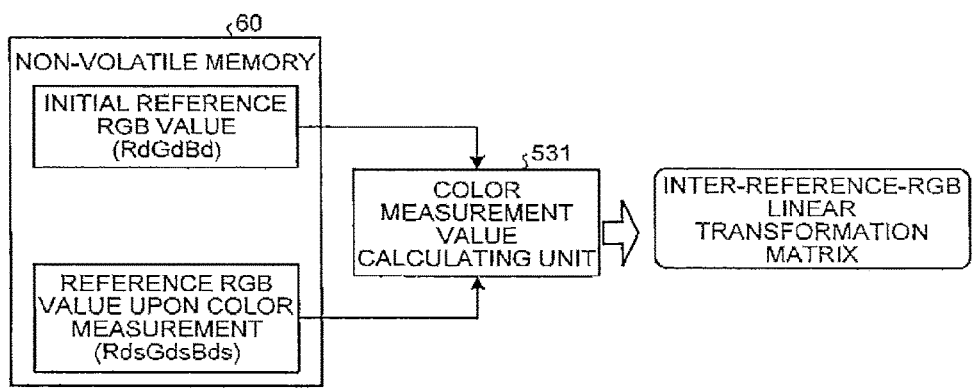
FIG. 30 is a view explaining a process of generating an inter-reference-RGB linear transformation matrix.

FIG. 30 is a view explaining a process of generating an inter-reference-RGB linear transformation matrix; and FIG. 31 is a view illustrating a relation between the initial reference RGB value and the reference RGB value upon color measurement. Before performing conversion of the color measurement target RGB value into the initialization color measurement target RGB value (RsGsBs) (step S10), the color measurement value calculating unit 531 generates an inter-reference-RGB linear transformation matrix used in this conversion. That is, as illustrated in FIG. 30, the color measurement value calculating unit 531 reads, from the non-volatile memory 60, the initial reference RGB value (RdGdBd) acquired upon preprocessing at the time of the initial state of the image forming apparatus 100 and the reference RGB value upon color measurement (RdsGdsBds) acquired at the time of adjustment of the image forming apparatus 100, and generates the inter-reference-RGB linear transformation matrix to convert the reference RGB value upon color measurement RdsGdsBds into the initial reference RGB value RdGdBd. Sequentially, the color measurement value calculating unit 531 stores the generated inter-reference-RGB linear transformation matrix in the non-volatile memory 60.

In FIG. 31, gray points in a space (a) are points in which the initial reference RGB values RdGdBd are plotted in the rgb space, and black points are points in which the reference RGB values upon color measurement RdsGdsBds are plotted in the rgb space. As seen from the space (a) in FIG. 31, the reference RGB values upon color measurement RdsGdsBds changes from the initial reference RGB values RdGdBd, and their change directions on the rgb space are substantially the same as illustrated in a space (b) in FIG. 31 but the deviation direction varies depending on a color phase. Thus, even when patches of the identical reference chart unit 400 are captured, a cause of variation in the RGB value includes a temporal change in the illumination light source 426 and a temporal change in the two-dimensional image sensor 431.

Thus, in a state where the RGB value acquired by image capturing in the image capturing unit 42 varies, if a color measurement value is calculated using a color measurement target RGB value acquired by capturing the patch image 200, an error may be caused in the color measurement value by the variation. Therefore, for the initial reference RGB value RdGdBd and the reference RGB value upon color measurement RdsGdsBds, an estimation method such as a least-square method is used to calculate an inter-reference-RGB linear transformation matrix to convert the reference RGB value on color measurement RdsGdsBds into the initial reference RGB value RdGdBd, which inter-reference-RGB linear transformation matrix is used to convert a color measurement target RGB value acquired by capturing the patch image 200 in the image capturing unit 42 into an initialization color measurement target RGB value RsGsBs, and basic color measurement processing (described later) is performed on the converted initialization color measurement target RGB value RsGsBs, thereby accurately acquiring the color measurement value of the patch image 200 of the color measurement target.

This inter-reference-RGB linear transformation matrix may be a non-linear matrix not only in a first order but also in a higher order; and, in a case where the non-linearity is high between the rgb space and the XYZ space, it is possible to improve conversion accuracy by providing a higher-order matrix.

As described above, after the color measurement value calculating unit 531 converts a color measurement target RGB value acquired by capturing the patch image 200 into an initialization color measurement target RGB value (RsGsBs) using an inter-reference-RGB linear transformation matrix (step S10), the color measurement value calculating unit 531 performs basic color measurement step S20 on this initialization color measurement target RGB value (RsGsBs).

Figure 32:
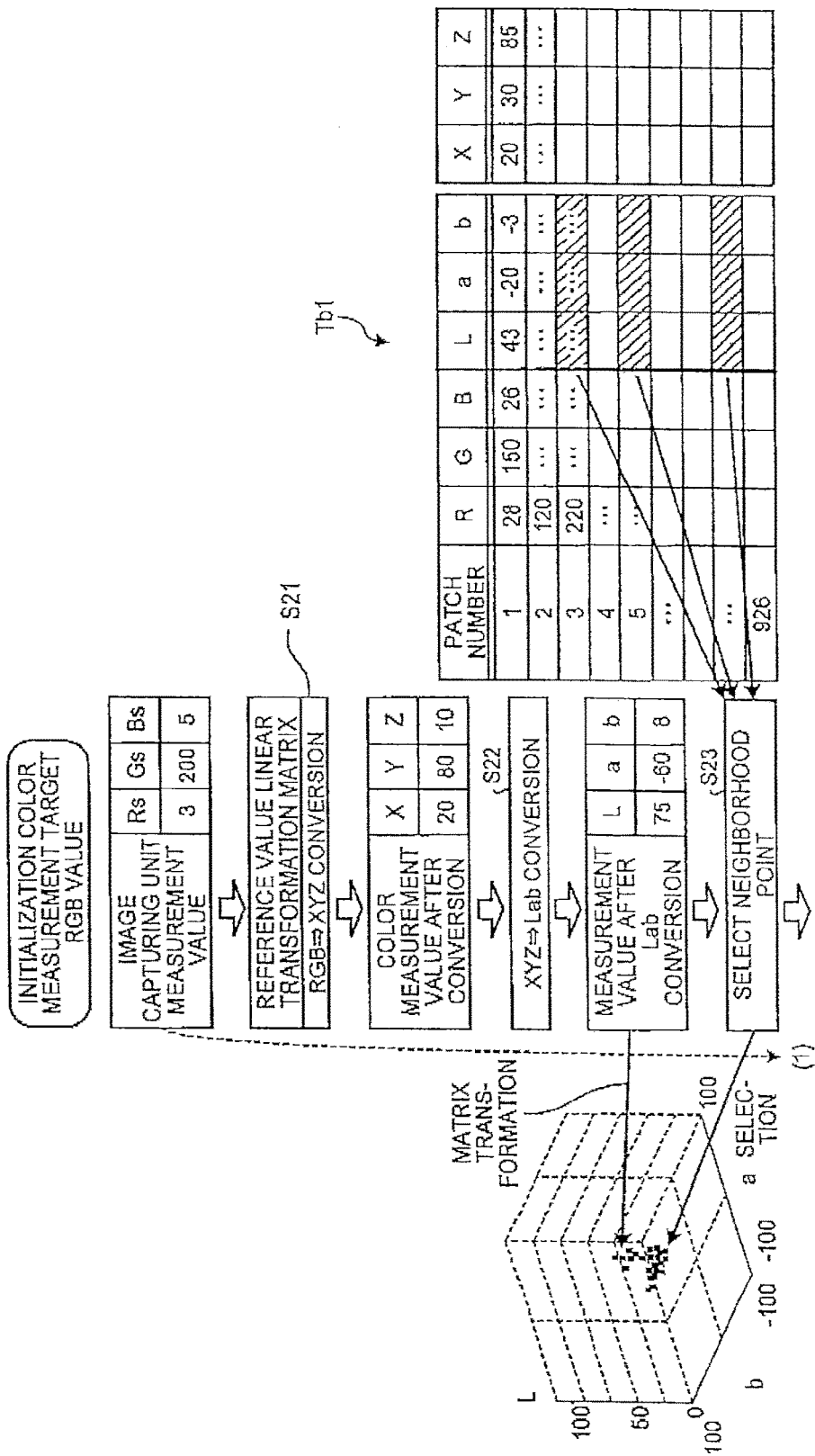
FIG. 32 is a view explaining a basic color measurement.
Figure 33:
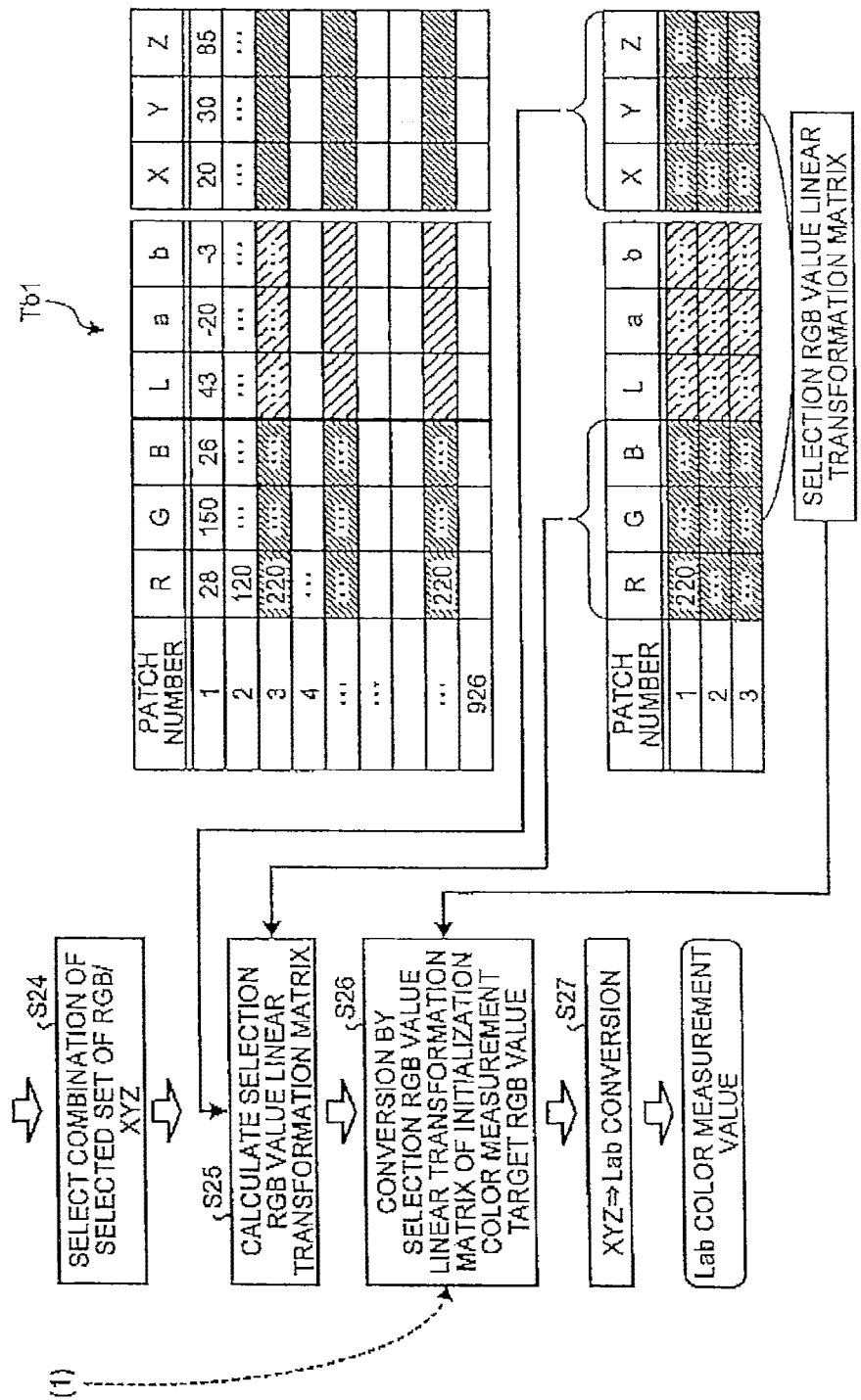
FIG. 33 is a view explaining a basic color measurement.

FIGS. 32 and 33 are views explaining a basic color measurement process. First, the color measurement value calculating unit 531 reads a reference value linear transformation matrix generated in preprocessing and stored in the non-volatile memory 60, converts the initialization color measurement target RGB value (RsGsBs) into a first XYZ value using the reference value linear transformation matrix, and stores the first XYZ value in the non-volatile memory 60 (step S21). FIG. 32 illustrates an example where the initialization color measurement target RGB value (3, 200, 5) is converted into the first XYZ value (20, 80, 10) by the reference value linear transformation matrix.

Next, the color measurement value calculating unit 531 converts the first XYZ value, which is converted from the initialization color measurement target RGB value (RsGsBs) in step S21, into a first Lab value using a known conversion equation, and stores the Lab value in the non-volatile memory 60 (step S22). FIG. 32 illustrates an example where the first XYZ value (20, 80, 10) is converted into the first Lab value (75, −60, 8) by the known conversion equation.

Next, the color measurement value calculating unit 531 searches the memory table Tb1 of the non-volatile memory 60 that stores therein a plurality of reference color measurement values (i.e. Lab values) in preprocessing, and, among the reference color measurement values (i.e. Lab values), selects a set of a plurality of patches (i.e. neighborhood-color patches) having reference color measurement values (i.e. Lab values) close to the first Lab value on the Lab space (step S23). As a method of selecting patches of a closer distance, for example, it is possible to employ a method of calculating a distance to the first Lab value for all reference color measurement values (i.e. Lab values) stored in the memory table Tb1 and selecting a plurality of patches having Lab values (in FIG. 32, hatched Lab values) closer to the first Lab value.

Next, as illustrated in FIG. 33, with reference to the memory table Tb1, the color measurement value calculating unit 531 extracts RGB values (i.e. reference RGB values) and XYZ values associated with the Lab values of the neighborhood-color patches selected in step S23, and selects a combination of an RGB value and XYZ value from these plural RGB values and XYZ values (step S24). Subsequently, the color measurement value calculating unit 531 calculates a selection RGB value linear transformation matrix to convert the RGB value of the selected combination (i.e. selection pair) into an XYZ value by a least-square method and stores the calculated selection RGB value linear transformation matrix in the non-volatile memory 60 (step S25).

Next, the color measurement value calculating unit 531 converts the initialization color measurement target RGB value (RsGsBs) into a second XYZ value using the selection RGB value linear transformation matrix generated in step S25 (step S26). Further, the color measurement value calculating unit 531 converts the second XYZ value calculated in step S26 into a second Lab value using a known conversion equation (step S27) and sets the acquired second Lab value Lab as a final color measurement value of the patch image 200 of the color measurement target. The image forming apparatus 100 performs color adjustment based on the color measurement value acquired by the above color measurement process, thereby enhancing the color reproducibility.

Other Modifications

Figure 34:
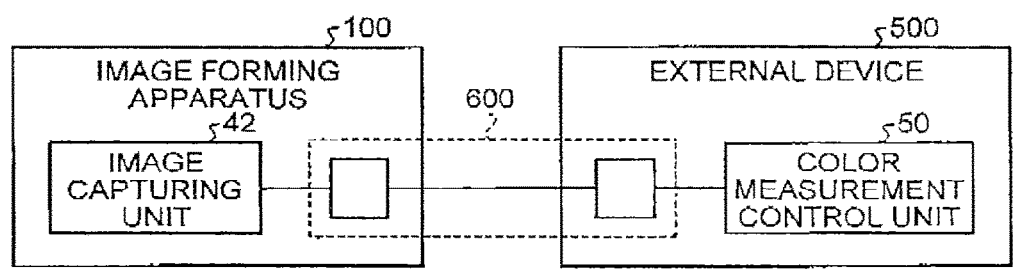
FIG. 34 is a view illustrating a schematic configuration of a color measuring system.

In the embodiment described above, the color measurement is carried out in the color measurement control unit 50 arranged in the image forming apparatus 100, but the color measurement does not necessarily need to be carried out inside the image forming apparatus 100. For instance, as illustrated in FIG. 34, an image forming system (color measuring system) in which the image forming apparatus 100 and an external device 500 are communicably connected my be built, and the function of the color measurement control unit 50 may be given to the external device 500 so that the color measurement is carried out in the external device 500. That is, the color measuring system has a configuration including the image capturing unit 42 arranged in the image forming apparatus 100, the color measurement control unit 50 arranged in the external device 500, and a communication unit 600 for connecting the image capturing unit 42 and the color measurement control unit 50 (image forming apparatus 100 and external device 500). The external device 500 may use a computer referred to as a DFE (Digital Front End), for example. The communication unit 600 can use, other than wired or wireless P2P communication, a communication using the network such as the LAN, Internet, and the like.

In the case of the configuration described above, for example, the image forming apparatus 100 transmits the image data including the subject such as the patch image 200 and the reference chart unit 400 captured by the image capturing unit 42 to the external device 500 using the communication unit 600. The external device 500 calculates the color measurement value of the patch image 200 using the image data received from the image forming apparatus 100, and generates a color conversion parameter for enhancing the color reproducibility of the image forming apparatus 100 based on the calculated color measurement value of the patch image 200. The external device 500 then transmits the generated color conversion parameter to the image forming apparatus 100 using the communication unit 600. The image forming apparatus 100 holds the color conversion parameter received from the external device 500, and when forming an image, corrects the image data using the color conversion parameter to form the image based on the corrected image data. The image forming apparatus 100 thus can perform image formation of high color reproducibility.

Furthermore, the external device 500 may hold the color conversion parameter generated based on the color measurement value of the patch image 200, and correct the image data in the external device 500. In other words, the image forming apparatus transmits the image data to the external device 500 when forming the image. The external device 500 corrects the image data received from the image forming apparatus 100 using the color conversion parameter it holds, and transmits the corrected image data to the image forming apparatus 100. The image forming apparatus 100 forms the image based on the corrected image data received from the external device 500. The image forming apparatus 100 thus can perform image formation of high color reproducibility.

Advantageous Effects of Embodiment

As described above in detail with reference to specific examples, the image capturing unit 42 according to the present embodiment includes the sensor unit 430 for capturing an image-capturing area including the subject such as the patch image 200, and the reference chart unit 400 arranged within the image-capturing area of the sensor unit 430 so as to be captured by the sensor unit 430 with the subject. The image of the subject including the reference chart unit 400 thus can be stably captured on a constant basis under the same conditions. Based on the image data including the subject such as the patch image 200 and the reference chart unit 400 captured by the sensor unit 430, the color measuring device according to the present embodiment can appropriately perform color measurement of the subject such as the patch image 200.

The image capturing unit 42 according to the present embodiment can capture the image in the sensor unit 430 with the bottom surface 421a of the housing 421 brought sufficiently close to the recording medium 16 on which the subject (i.e., patch image 200) is formed, so that the difference between the light path length from the sensor unit 430 to the subject (i.e., patch image 200) and the light path length from the sensor unit 430 to the reference chart unit 400 is set within the range of the depth of field of the sensor unit 430, and it becomes possible to capture an image focusing on both the subject (i.e. patch image 200) and the reference chart unit 400.

The image forming apparatus 100 according to the present embodiment includes the color measuring device according to the present embodiment, and thus the color measurement can be accurately performed on the patch image 200 while outputting the patch image 200 of color measurement target, the output characteristics can be appropriately adjusted, and high quality image can be output.

As described above, although specific embodiments have been described above in detail, the present invention is not limited to the embodiments, and various changes and modifications can be made without departing from the scope of the present invention on the stage of implementation.

For instance, in the embodiment described above, the reference chart unit 400 has a configuration including the reference patch arrays 401 to 404 for color measurement, the pattern array 406 for dot measurement, the distance measurement line 405, and the chart position specification markers 407. However, the reference chart unit 400 may be configured to include only some of the reference patch arrays 401 to 404 for color measurement, the pattern array 406 for dot measurement, the distance measurement line 405, and the chart position specification markers 407. The reference chart unit 400 may be configured to include only the reference patch array 403, which is an achromatic scale pattern, among the reference patch arrays 401 to 404 for color measurement, or may be configured to include only chromatic reference patch arrays 401, 402, and 404.

If the reference chart unit 400 does not have the configuration including the reference patch arrays 401 to 404 for color measurement, the arithmetic unit 53 of the color measurement control unit 50 illustrated in FIG. 7 does not need the function of the color measurement value calculating unit 531. If the reference chart unit 400 does not have the configuration including the distance measurement line 405, the arithmetic unit 53 of the color measurement control unit 50 illustrated in FIG. 7 does not need the function of the positional deviation amount calculating unit 532. Furthermore, if the reference chart unit 400 does not have the configuration including the pattern array 406 for dot measurement, the arithmetic unit 53 of the color measurement control unit 50 illustrated in FIG. 7 does not need the function of the dot diameter calculating unit 533.

Also, the control function of each unit forming the image forming apparatus 100 and the color measuring device according to the above embodiments can be realized using hardware, software or a combined configuration of hardware and software. When realizing the control function of each unit forming the image forming apparatus 100 and the color measuring device according to the above embodiments using software, a processor held in the image forming apparatus 100 and the color measuring device executes a program describing a processing sequence. The program executed by the processor is provided in a manner incorporated in advance in a ROM inside the image forming apparatus 100 and the color measuring device, for example. Also, the computer program executed by the processor may be provided in a manner recorded in a computer-readable recording medium such as a CD-ROM, an FD (Flexible Disc), a CD-R and a DVD (Digital Versatile Disc), as a file in an installable or an executable format.

Furthermore, the computer program executed by the processor may be provided in a manner stored in a computer connected to a network such as the Internet so as to be made available for downloads via the network. Moreover, the computer program executed by the processor may be provided or distributed over a network such as the Internet.

According to the present invention, an effect of stably capturing an image including a subject and a reference chart unit is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image capturing device comprising:
   an image sensor configured to substantially simultaneously image-capture a subject and a reference chart, the image sensor having an image-capturing range including a subject image-capturing area in which the subject is captured and a reference chart capturing area in which the reference chart is captured; and
   a lens disposed in an optical path of the image sensor, wherein the subject image-capturing area and the reference chart capturing area are adjacent to each other, the subject and the reference chart are at positions separated from each other, and the reference chart is movable with respect to the subject.

2. The image capturing device according to claim 1, wherein the subject image-capturing area and the reference chart capturing area do not overlap each other.

3. The image capturing device according to claim 1, further comprising a processor configured to correct a captured image result of capturing the subject based on a captured image result of capturing the reference chart.

4. The image capturing device according to claim 1, wherein the subject and the reference chart are illuminated in substantially a same illumination condition.

5. The image capturing device according to claim 1, wherein the reference chart includes a plurality of chromatic patches.

6. The image capturing device according to claim 5, wherein the plurality of chromatic patches are divided into blocks.

7. The image capturing device according to claim 1, further comprising a memory configured to store colors of the reference chart.

8. The image capturing device according to claim 3, wherein the processor is configured to perform color measurement on the subject using the corrected captured image result.

9. A color measurement method comprising:

substantially simultaneously image-capturing a subject and a reference chart using a lens and an image sensor; and correcting a captured image result of capturing the subject based on a captured image result of capturing the reference chart, wherein a subject image-capturing area in which the subject is captured and a reference chart capturing area in which the reference chart is captured are adjacent to each other, the subject and the reference chart are at positions separated from each other, and the reference chart is movable with respect to the subject.

\* \* \* \* \*